US008739869B2

(12) United States Patent
Willingham et al.

(10) Patent No.: US 8,739,869 B2
(45) Date of Patent: Jun. 3, 2014

(54) SYSTEMS AND METHODS FOR ENHANCED WATERFLOODS

(75) Inventors: Thomas W Willingham, Sugar Land, TX (US); Robin Gupta, Houston, TX (US); Mauro Lo Cascio, Houston, TX (US); Peter Griffin Smith, Jr., Houston, TX (US); Jung-gi Jane Shyeh, Houston, TX (US); Robert D. Kaminsky, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 319 days.

(21) Appl. No.: 13/286,901

(22) Filed: Nov. 1, 2011

(65) Prior Publication Data

US 2012/0125603 A1 May 24, 2012

Related U.S. Application Data

(60) Provisional application No. 61/415,692, filed on Nov. 19, 2010, provisional application No. 61/432,078, filed on Jan. 12, 2011.

(51) Int. Cl.
*E21B 43/16* (2006.01)
*E21B 43/40* (2006.01)

(52) U.S. Cl.
USPC .............. 166/272.6; 166/75.12; 166/90.1; 166/266; 166/267

(58) Field of Classification Search
None
See application file for complete search history.

(56) References Cited

U.S. PATENT DOCUMENTS

| | | |
|---|---|---|
| 1,651,311 A | 11/1927 | Atkinson |
| 3,028,912 A | 4/1962 | Berry et al. |
| 3,381,388 A | 5/1968 | Chakravarti et al. |
| 3,459,653 A | 8/1969 | Benson |
| 3,468,789 A | 9/1969 | Balassa |
| 3,475,318 A | 10/1969 | Gable et al. |
| 3,526,585 A | 9/1970 | Camp |
| 3,553,099 A | 1/1971 | Savage et al. |
| 3,573,196 A | 3/1971 | Cymbalist |
| 3,973,930 A | 8/1976 | Burgess |
| 4,021,335 A | 5/1977 | Beaton |
| 4,036,732 A | 7/1977 | Irani et al. |
| 4,057,486 A | 11/1977 | Meadus et al. |
| 4,074,755 A | 2/1978 | Hill et al. |
| 4,081,029 A | 3/1978 | Holm |
| 4,110,194 A | 8/1978 | Peterson et al. |
| 4,111,789 A | 9/1978 | Porteous et al. |
| 4,141,416 A | 2/1979 | Holm |
| 4,176,465 A | 12/1979 | Murray et al. |
| 4,236,896 A | 12/1980 | Morris et al. |
| 4,239,617 A | 12/1980 | Karnofsky |
| 4,266,610 A | 5/1981 | Meister |
| 4,273,644 A | 6/1981 | Harris et al. |
| 4,308,132 A | 12/1981 | McCarthy |
| 4,311,561 A | 1/1982 | Hastings |
| 4,315,815 A | 2/1982 | Gearhart |
| 4,347,118 A | 8/1982 | Funk et al. |
| 4,388,181 A | 6/1983 | Rainis et al. |
| 4,411,673 A | 10/1983 | Jones et al. |
| 4,415,442 A | 11/1983 | Rhodes |
| 4,416,769 A | 11/1983 | McCaffrey et al. |
| 4,421,168 A | 12/1983 | Hurd |
| 4,422,901 A | 12/1983 | Karnofsky |
| 4,424,112 A | 1/1984 | Rendall |
| 4,436,618 A | 3/1984 | Rigby |
| 4,450,067 A | 5/1984 | Angevine et al. |
| 4,458,760 A | 7/1984 | Hurd |
| 4,459,202 A | 7/1984 | Garcia |
| 4,466,892 A | 8/1984 | Chan et al. |
| 4,476,013 A | 10/1984 | McCaffrey |
| 4,495,057 A | 1/1985 | Amirijafari et al. |
| 4,508,597 A | 4/1985 | Roach |
| 4,515,685 A | 5/1985 | Yeh |
| 4,532,024 A | 7/1985 | Haschke et al. |
| 4,572,777 A | 2/1986 | Peck |
| 4,572,781 A | 2/1986 | Krasuk et al. |
| 4,584,087 A | 4/1986 | Peck |
| 4,634,520 A | 1/1987 | Angelov et al. |

(Continued)

FOREIGN PATENT DOCUMENTS

| | | |
|---|---|---|
| CA | 993392 | 7/1976 |
| CA | 1013695 | 7/1977 |

(Continued)

OTHER PUBLICATIONS

ASTMD5673-10 "Standard Test Method for Elements in Water by Inductively Coupled Plasma—Mass Spectrometry" (2013).

(Continued)

*Primary Examiner* — Zakiya W Bates
(74) *Attorney, Agent, or Firm* — ExxonMobil Upstream Research Company—Law Department

(57) ABSTRACT

Methods for enhanced oil recovery from a subterranean formation including adding a first salt to a first aqueous stream to form a first injection stream with an increased concentration of a first ion. A second salt is added to a second aqueous stream to form a second injection stream with an increased concentration of a second ion. The second injection stream is of different composition than the first injection stream and the first injection stream and the second injection stream have substantially the same interfacial tension with a hydrocarbon and substantially the same kinematic viscosity. The first injection stream is injected into the formation at a first time and the second injection stream is injected into the formation at a second time. The first injection stream and second injection stream contact at least some overlapping portion of the formation. Oil is recovered from the overlapping portion of the formation.

38 Claims, 25 Drawing Sheets

(56) References Cited

U.S. PATENT DOCUMENTS

| | | |
|---|---|---|
| 4,640,760 A | 2/1987 | Billings |
| 4,666,562 A | 5/1987 | Nelson |
| 4,699,709 A | 10/1987 | Peck |
| 4,714,113 A | 12/1987 | Mohnot et al. |
| 4,719,008 A | 1/1988 | Sparks et al. |
| 4,722,782 A | 2/1988 | Graham et al. |
| 4,762,178 A | 8/1988 | Falls et al. |
| 4,802,975 A | 2/1989 | Mehlberg |
| 4,828,031 A | 5/1989 | Davis |
| 4,875,998 A | 10/1989 | Rendall |
| 4,888,108 A | 12/1989 | Farnand |
| 4,906,355 A | 3/1990 | Lechnick et al. |
| 4,968,412 A | 11/1990 | Guymon |
| 4,994,175 A | 2/1991 | Hargreaves et al. |
| 5,143,598 A | 9/1992 | Graham et al. |
| 5,236,577 A | 8/1993 | Tipman et al. |
| 5,246,072 A | 9/1993 | Frazier et al. |
| 5,363,915 A | 11/1994 | Marquis et al. |
| 5,534,136 A | 7/1996 | Rosenbloom |
| 5,728,202 A | 3/1998 | Nelson et al. |
| 5,746,909 A | 5/1998 | Calta |
| 5,876,592 A | 3/1999 | Tipman et al. |
| 5,968,349 A | 10/1999 | Duyvesteyn et al. |
| 6,007,709 A | 12/1999 | Duyvesteyn et al. |
| 6,074,558 A | 6/2000 | Duyvesteyn et al. |
| 6,214,213 B1 | 4/2001 | Tipman et al. |
| 6,358,403 B1 | 3/2002 | Brown et al. |
| 6,358,404 B1 | 3/2002 | Brown et al. |
| 6,474,413 B1 | 11/2002 | Barbosa et al. |
| 6,712,215 B2 | 3/2004 | Scheybeler |
| 7,395,858 B2 | 7/2008 | Barbosa et al. |
| 7,455,109 B2 | 11/2008 | Collins |
| 7,581,594 B2 | 9/2009 | Tang |
| 7,803,278 B2 | 9/2010 | Talbot et al. |
| 7,897,546 B2 | 3/2011 | Showalter et al. |
| 7,928,042 B2 | 4/2011 | Reed et al. |
| 7,987,546 B2 | 8/2011 | Poch et al. |
| 7,987,907 B2 | 8/2011 | Collins et al. |
| 2001/0020531 A1 | 9/2001 | Varadaraj et al. |
| 2004/0055972 A1 | 3/2004 | Garner et al. |
| 2007/0039372 A1 | 2/2007 | Liu et al. |
| 2007/0215351 A1 | 9/2007 | Wernli et al. |
| 2007/0246426 A1 | 10/2007 | Collins |
| 2008/0011475 A1 | 1/2008 | Berger et al. |
| 2009/0029879 A1 | 1/2009 | Soni et al. |
| 2009/0194281 A1 | 8/2009 | Sheng |
| 2010/0020531 A1 | 1/2010 | Choi et al. |
| 2010/0126727 A1 | 5/2010 | Vinegar et al. |
| 2011/0030967 A1 | 2/2011 | McGuire |
| 2012/0018160 A1 | 1/2012 | Al-Yousef et al. |
| 2012/0018161 A1 | 1/2012 | Al-Yousef et al. |
| 2012/0090833 A1 | 4/2012 | Ligthelm et al. |

FOREIGN PATENT DOCUMENTS

| | | |
|---|---|---|
| CA | 1027501 | 3/1978 |
| CA | 1081642 | 7/1980 |
| CA | 1094484 | 1/1981 |
| CA | 1239888 | 8/1988 |
| CA | 1272975 | 8/1990 |
| CA | 2173559 | 10/1996 |
| CA | 1249976 | 2/1998 |
| CA | 2200899 | 9/1998 |
| CA | 2232929 | 9/1998 |
| CA | 2217300 | 3/1999 |
| CA | 2350907 | 5/2000 |
| CA | 2272035 | 11/2000 |
| CA | 2272045 | 11/2000 |
| CA | 2350001 | 12/2001 |
| CA | 2353109 | 1/2003 |
| CA | 2400258 | 3/2004 |
| CA | 2454842 | 7/2004 |
| EP | 0249856 | 6/1987 |
| EP | 0372761 | 11/1998 |
| GB | 722419 | 1/1955 |
| GB | 1340022 | 12/1973 |
| GB | 2001670 | 2/1979 |
| GB | 2450269 | 5/2011 |
| WO | WO 2005/106192 | 11/2005 |
| WO | WO 2005/106192 A1 | 11/2005 |
| WO | WO 2005/119007 | 12/2005 |
| WO | WO 2008/029131 | 3/2008 |

OTHER PUBLICATIONS

ASTMD5907 "Standard Test Methods for Filterable Matter (Total Dissolved Solids) and Nonfilterable Matter (Total Suspended Solids) in Water" (2013).

Bajpai, D., et al. (2007) "Laundry Detergents: An Overview", Journal of Oleo Science, 56, pp. 327-340.

Bortolotti, V. et al. (Aug. 2009) "Laboratory Evaluation of Alkali and Alkali-Surfactant-Polymer Flooding Combined with Intermittent Flow in Carbonatic Rocks" SPE 122499.

Campbell, T.C., et al. (1982) "The Role of Alkaline Chemicals in Recovery of Low-Gravity Crude Oils" SPE 8894-PA, vol. 34, pp. 2510-2516.

Cheng, K.H. (1986), "Chemical Consumption During Alkaline Flooding: A Comparative Evaluation",—SPE 14944.

Gupta, Robin et al. (Mar. 2011) "Enhanced Waterflood for Middle Esst Carbonate Cores—Impact of Injection Water Composition" SPE 142668.

Hiorth, A., et al. (2010) "The Impact of Pore Water Chemistry on Carbonate Surface Charge and Oil Wettability" Transp Porous Med 85:1-21.

Kestin, et al., "Tables of the dynamic and kinematic viscosity of aqueous NaCl solutions in the temperature range 20-150C and the pressure range 0.1-35MPa", J. Phys. Chem. Ref. Data, vol. 10, No. 1 (1981).

Lager, A., et al. (2006) "Low Salinity Oil Recovery—An Experimental Investigation," presented at the International Symposium of the Society of Core Analysis, Trondheim, Norway, Sep. 12-16, 2006.

Shiyi, et al. (1998) "Effects of Important Factors on Alkali/Surfactant/Polymer Flooding", SPE 50916, pp. 357-374.

Strand, S., et al. (2008), "Effect of Temperature on Enhanced Oil Recovery form Mixed-Wet Chalk Cores by Spontaneous Imbibition and Forced Displacement Using Seawater", Energy and Fuels, v. 22, pp. 3222-3225.

Tang, G.Q, et al. (1999) "Influence of brine composition and fines migration on crude oil brine rock interactions and oil recovery" Journal of Petroleum Science and Engineering, vol. 24, pp. 99-111.

Van Wazer, J.R., et al. (1958), Builders and Other Detergent Adjuvants for Water Washes, Journal of The American Oil Chemists' Society, pp. 552-558.

Webb, K.J., et al. (2005) "A laboratory study investigating methods for improving oil recovery in carbonates" SPE 10506-MS (Nov. 2005).

Al-Mumen, A.A, (1990) "*Effect of Injected Water Salinity on Oil Recovery*", Masters Thesis, Presented to the Faculty of the College of Graduate Studies King Fahd University of Petroleum & Minerals, Dhahran, Saudi Arabia.

Alotaibi, M.B., et al (2010) "Wettability Challenges in Carbonate Reservoirs," SPE 129972, presented at SPE Improved Oil Recovery Symposium, Tulsa, Oklahoma, Apr. 24-28.

Bagri, S., et al. (2001) "Effect of brine composition and alkali flood in the permeability damage of limestone reservoirs," SPE 65394, presented at SPE International Symposium on Oilfield Chemistry, Houston, Texas, Feb. 13-16.

Beckner., B.L., et al. (2001) "EMpower: New Reservoir Simulation System", paper SPE 68116 presented at the SPE Middle East Oil Show, Bahrain, Mar. 17-20.

Beckstrom, (1926) "The Effect of Flooding Oil Sands With Alkaline Solutions", *Bulletin of the American Association of Petroleum Geologists*, vol. 11, No. 3.

Behzadi, S.H., et al. (2009) "A new EOR Method" *SPE 123866* SPE Annual Technical Conference and Exhibition, Oct. 4-7, New Orleans.

(56) References Cited

OTHER PUBLICATIONS

Berger, P.D., et al., (2006) "Improved ASP Process Using Organic Alkali", *SPE 99581*, SPE/DOE Symposium on Improved Oil Recovery, Apr. 22-25, Tulsa OK.

Bortolotti, V., et al. (2009) Intermittent Alkali Flooding in Vertical Carbonate Reservoirs, *SPE 121832*, EUROPEC/EAGE Conference and Exhibition, Jun. 8-11, Amsterdam, The Netherlands.

Campbell, T.C. (1982) "The Role of Alkaline Chemicals in the Recovery of Low-Gravity Crude Oils", *Journal of Petroleum Technology*, vol. 34, No. 11.

Chen, G.-Y. et al., (2005) "Study of the Effect of Injection Water Quality on the Interfacial Tension of ASP/Crude Oil", *Journal of Canadian Petroleum Technology*, February, vol. 46, No. 2.

deZabala, E.F., et al. (1982) "A Chemical Theory of Alkali Flooding", *SPE Journal*, April, vol. 22, No. 2.

Ehrlic, R, et al. (1974) "Alkaline Waterflooding for Wettability Alteration-Evaluating a Potential Field Application", *Journal of Petroleum Technology*, December, vol. 26, No. 12.

Flaaten, A.K., et al. (2008) "Alkaline/Surfactant/Polymer Chemical Flooding Without the Need for Soft Water", *SPE 116754*, March, vol. 15, No. 1.

Gangoli, N. et al. (1977) "Enhanced Oil Recovery Techniques—State of the Art Review", *SPE 6974*.

Griffin, T. et al.,(2007) "Waterflood Performance in a Depleted Fractured Chalk Reservoir", *SPE 108687*, Offshore Europe, Sep. 4-7, Aberdeen, Scotland, U.K.

Hallenbeck, L.D., et al., (1991) "Implementation of the Ekofisk Field Waterflood," *SPE Formulation Evaluation*, vol. 6, No. 3, 284-290, September.

Hirasaki, G. J., et al., (2008) "Recent Advances in Surfactant EOR", *SPE 115386*, SPE Annual Technical Conference and Exhibition, Sep. 21-24, Denver, CO.

Høgnesen, E.J., et al. (2005) "Waterflooding of Preferential Oil-Wet Carbonates: Oil Recovery Related to Reservoir Temperature and Brine Composition," *SPE 94166*, presented at SPE EAGE Annual Conference, Madrid, Spain, Jun. 13-16.

Illman, J.C., et al., (1972), "Studies on Replacement of Phosphate Builders in Laundry Detergents Using Radiolabeled Soils", *Journal of the American Oil Chemists' Society*, vol. 49, No. 4, 217-221; April.

Krumrine, P.H., et al. (1987) "Beyond Alkaline Flooding: Design of Complete Chemical Systems", *SPE 16280*, SPE International Symposium on Oilfield Chemistry, Feb. 4-6, San Antonio, TX.

Ligthelm, D.L., et al., (2009) "Novel Waterflooding Strategy by Manipulation of Injection Brine Composition," *SPE 119835*, presented in EUROPEC/EAGE Conference and Exhibition, Amsterdam, The Netherlands, Jun. 8-11.

Mayer, E.H. et al. (1983) "Alkaline Injection for Enhanced Oil Recovery—A Status Report", *Journal of Petroleum Technology*, January, vol. 35, No. 1.

Mohnot, S.M., et al. (1987) "A study of Mineral/Alkali Reactions", *SPE 13032*, SPE Reservoir Engineering, November, vol. 2, No. 4.

Najafabadi, N.F., et al (2008) "Chemical Flooding of Fracture Carbonates using Wettability Modifiers", *SPE 113369*, SPE/DOE Symposium on Improved Oil Recovery, Apr. 20-23, Tulsa, OK.

Nutting, P.G. (1925); "Chemical Problems in Water Driving of Petroleum from Oil Sands", *Industrial and Engineering Chemistry*; vol. 17, No. 10, p. 1035-1036; October.

Peru, D.A., et al. (1990), "Surfactant-Enhanced Low-pH Alkaline Flooding", *SPE Reservoir Engineering*, August, vol. 5, No. 3.

Puntervold, T., et al., (2009) "Coinjection of Seawater and Produced Water to Improve Oil Recovery From Fractured North Sea Chalk Oil Reservoirs," *Energy and Fuels*, 23, 2527-2536.

Strand, S., et al.: (2003), "Spontaneous Imbibition of Aqueous Surfactant Solutions Into Natural to Oil-Wet Carbonate Cores: Effect of Brine Salinity and Composition," *Energy and Fuels*, 17, 1133-1144.

Strand, S., et al., (2008) "Effect of Temperature on Enhanced Oil Recovery From Mixed-Wet Chalk Cores by Spontaneous Imbibition and Forced Displacement Using Seawater," *Energy and Fuels*, 22, 3222-3225.

Sylte, J.E., et al., (1988) "Ekofisk Formation Pilot Waterflood," *SPE 18276*, presented at SPE Annual Technical Conference and Exhibition, Houston, Texas, Oct. 2-5.

Taber, J.J, et al. (1983) "Technical Screening Guides for the Enhanced Recovery of Oil", SPE 12069, presented at *SPE Annual Technical Conference and Exhibition*, San Francisco California, Oct. 5-8.

Thomas, S. (2006) "Chemical EOR—The Past—Does It Have a Future" *Society of Petroleum Engineers Distinguished Lecturer Series*.

Tweheyo, M.T., et al. (2006) "The Effects of Temperature and Potential Determining Ions Present in Seawater on Oil Recovery From Fractured Carbonates," *SPE 99438*, SPE/DOE Symposium on Improved Oil Recovery, Tulsa, Oklahoma, Apr. 22-26.

Verma, S., et al. (2009) "Modeling Improved Recovery Methods in an Unstructured Grid Simulator", presented at the *International Petroleum Technology Conference*, Doha, Qatar, Dec. 7-9.

Wang, W., et al, (2003) "Interactions of Alkaline Solutions With Oil-Brine-Rock Systems in ASP Flood Processes", *Conference Paper 2003-142, Canadian International Petroleum Conference*, Jun. 10-12, Calgary, Alberta.

Yousef, A.A., et al. (2010) "Laboratory Investigation of Novel Oil Recovery Method for Carbonate Reservoirs," *SPE 137634*, presented at *Canadian Unconventional Resources and International Petroleum Conference*, Calgary, Canada, Oct. 19-21.

Zhang, P., et al. (2006) "Wettability alteration and improved oil recovery in chalk: The effect of calcium in the presence of sulfate ,"*Energy and Fuels*, 20, 2056-2062.

Zhang, D.L., et al. (2006) "Favorable Attributes of Alkaline-Surfactant-Polymer Flooding", *SPE 99744*, SPE/DOE Symposium on Improved Oil Recovery, Apr. 22-26, Tulsa, OK.

Zhang, P., et al. (2007) "Wettability alteration and improved oil recovery by spontaneous imbibition of seawater into chalk: Impact of the potential determining ions $Ca^{2+}$, $Mg^{2+}$, and $SO_4^{2-}$," *Colloids and Surfaces*, 301, 199-208.

(A)          (B)

1100

SYSTEMS AND METHODS FOR ENHANCED WATERFLOODS

CROSS-REFERENCE TO RELATED APPLICATIONS

This application claims priority benefit of U.S. Provisional Application Ser. No. 61/415,692 filed Nov. 19, 2010 entitled: "Systems and Methods for Enhanced Waterfloods Using Advanced Ion Management," and U.S. Provisional Application Ser. No. 61/432,078 filed Jan. 12, 2011 entitled: "Systems and Methods for Enhanced Waterfloods," the entirety of which are incorporated by reference herein.

FIELD

The present disclosure relates generally to systems and methods for enhancing oil recovery using waterflood methods. More particularly, the present disclosure relates to systems and methods of using advanced ion management to enhance conventional waterflood techniques.

BACKGROUND

This section is intended to introduce the reader to various aspects of art, which may be associated with embodiments of the present invention. This discussion is believed to be helpful in providing the reader with information to facilitate a better understanding of particular techniques of the present invention. Accordingly, it should be understood that these statements are to be read in this light, and not necessarily as admissions of prior art.

Historically, there have been limited publications on the effect of changing ion composition for waterflooding of carbonate reservoirs. The process often caused problems in carbonate reservoirs due to adverse reactions between the injected water and anhydrite or gypsum which may exist in the carbonate reservoir. See Taber, J. J., and Martin, F. D., "Technical Screening Guides for the Enhanced Recovery of Oil", SPE 12069, presented at SPE Annual Technical Conference and Exhibition, San Francisco, Calif., 5-8 Oct. 1983. The trend, however, has been changing recently due to an increased interest in enhanced waterflooding (EWF). A better than expected oil recovery at a fractured chalk reservoir at the Ekofisk field in the North Sea has provided some motivation for these studies. See, e.g., Puntervold, T., Strand, S., and Austad, T., "Coinjection of seawater and produced water to improve oil recovery from fractured North Sea chalk oil reservoirs," *Energy and Fuels*, 23, 2527-2536 (2009); Strand, S., Puntervold, T., and Austad, T., "Effect of temperature on enhanced oil recovery from mixed-wet chalk cores by spontaneous imbibition and forced displacement using seawater," *Energy and Fuels*, 22, 3222-3225 (2008); Tweheyo, M. T., Zhang, P., and Austad, T., "The Effects of Temperature and Potential Determining Ions Present in Seawater on Oil Recovery From Fractured Carbonates," SPE 99438, SPE/DOE Symposium on Improved Oil Recovery, Tulsa, Okla., 22-26 Apr. 2006; Høgnesen , E. J., Strand, S., and Austad, T., "Waterflooding of Preferential Oil-Wet Carbonates: Oil Recovery Related to Reservoir Temperature and Brine Composition," SPE 94166, presented at SPE EAGE Annual Conference, Madrid, Spain, 13-16 Jun., 2005; Zhang, P., Tweheyo, M. T., and Austad, T., "Wettability alteration and improved oil recovery in chalk: The effect of calcium in the presence of sulfate ," Energy and Fuels, 20, 2056-2062 (2006); Zhang, P., Tweheyo, M. T., and Austad, T., "Wettability alteration and improved oil recovery by spontaneous imbibition of seawater into chalk: Impact of the potential determining ions $Ca^{2+}$, $Mg^{2+}$, and $SO_4^{2-}$," Colloids and Surfaces, 301,199-208 (2007). These articles are generally referred to herein as "the Austad studies." The Austad studies focused on spontaneous imbibition tests for laboratory measurements with the goal of improving the imbibition processes suitable for fractured chalk reservoirs. Sulfate anions of various concentrations were added to sea water in those studies.

In addition, Ligthelm, D. L., Gronsveld, J., Hofman, J. P., Brussee, N. J., Marcelis, F., and van der Linde, H. A.: "Novel Waterflooding Strategy by Manipulation of Injection Brine Composition," SPE 119835, presented in EUROPEC/EAGE Conference and Exhibition, Amsterdam, The Netherlands, 8-11 Jun., 2009 have performed spontaneous imbibition experiments on Middle Eastern limestone with 5% increment in oil recovery, giving a 17% total recovery of original oil-in-place (OOIP). However, Høgnesen , E. J., Strand, S., and Austad, T.: "Waterflooding of Preferential Oil-Wet Carbonates: Oil Recovery Related to Reservoir Temperature and Brine Composition," SPE 94166, presented at SPE EAGE Annual Conference, Madrid, Spain, 13-16 Jun., 2005 have observed no effect of high sulfate brine during spontaneous imbibition on unfractured limestone treated with modified crude oil. As opposed to spontaneous imbibition studies, there have been few publications of laboratory coreflooding studies in which the waterflood performance is enhanced by adding inorganic salts for use in unfractured carbonates, such as limestones and dolomites, among others. In one such study, Bortolotti, V., Gottardi, G., Macini, P., and Srisuriyachai, F., "Intermittent Alkali Flooding in Vertical Carbonate Reservoir", SPE 121832, presented at the SPE EUROPEC/EAGE Annual Conference and Exhibition held in Amsterdam, The Netherlands, 8-11 Jun. 2009, the authors discussed a technique for intermittent flow of an alkali solution for enhancing oil recovery. A concentrated alkali solution is injected into a reservoir, and the flow is intermittently paused before being resumed. The laboratory results showed a greater oil recovery than continuous flow without the pausing.

Previous published work has reported enhanced oil recovery by adding sulfate to the brine with chalk cores for both spontaneous imbibition and corefloods. See Høgnesen , E. J., Strand, S., and Austad, T.: "Waterflooding of Preferential Oil-Wet Carbonates: Oil Recovery Related to Reservoir Temperature and Brine Composition," SPE 94166, presented at SPE EAGE Annual Conference, Madrid, Spain, 13-16 Jun., 2005; Strand, S., Puntervold, T., and Austad, T., "Effect of temperature on enhanced oil recovery from mixed-wet chalk cores by spontaneous imbibition and forced displacement using seawater," *Energy and Fuels*, 22, 3222-3225 (2008); and Puntervold, T., Strand, S., and Austad, T.: "Coinjection of seawater and produced water to improve oil recovery from fractured North Sea chalk oil reservoirs," *Energy and Fuels*, 23, 2527-2536 (2009). Other studies have examined spontaneous imbibition in limestone cores. See Ligthelm, D. L., Gronsveld, J., Hofman, J. P., Brussee, N. J., Marcelis, F., and van der Linde, H. A., "Novel Waterflooding Strategy by Manipulation of Injection Brine Composition," SPE 119835, presented in EUROPEC/EAGE Conference and Exhibition, Amsterdam, The Netherlands, 8-11 Jun., 2009.

In contrast, a number of studies have focused on ion changes in concert with surfactant or polymer injection into reservoirs. For example, in Bortolotti, V., Macini, P., and Srisuriyachai, F., "Laboratory Evaluation of Alkali and Alkali-Surfactant-Polymer Flooding Combined with Intermittent Flow in Carbonate Rocks", SPE 122499, presented at the SPE Asia Pacific Oil and Gas Conference and Exhibition held in Jakarta, Indonesia, 4-6 Aug. 2009, the authors combined an alkali-surfactant-polymer flood with the intermittent or paused flow discussed previously. One set of results indicated that high alkali concentration, e.g., greater than about 0.5 molar alkali is not recommended, due to the formation of in-situ produced soap. Another set of results indicated that the highest final recovery may be obtained by injecting a surfactant, intermittently flowing an alkali solution through the reservoir, then flooding the reservoir with a polymer solution.

U.S. Patent Publication No. 2008/0011475 by Berger, et al. discloses an oil recovery method that uses amphoteric surfactants. The method is performed by injecting into an aqueous solution containing a mixture of amphoteric surfactants into one or more injection wells. The amphoteric surfactants have a hydrocarbyl chain length between 8 and 26, and some degree of unsaturation. Oil is recovered from one or more producing wells. The aqueous solution can also contain a thickening agent, an alkali, or a co-solvent.

International Patent Application Publication No. WO 2005/106192, by Austad, discloses a method for displacing petroleum from a carbonate rock. In the disclosed method, a positive electrical potential of the carbonate is reduced. This is performed by injecting a fluid that supplies negatively charged ions. As a result, the degree of recovery of petroleum is enhanced.

International Patent Application Publication No. WO 2008/029131, by Collins, et al., discloses a method for hydrocarbon recovery by waterflooding of a subterranean formation. The aqueous injection medium comprises a water soluble organic compound that contains an oxygen or nitrogen atom.

U.S. Pat. No. 4,074,755 to Hill, et al., discloses a waterflood process for recovering oil that is chemically aided and controlled by an ion exchange. The process involves successively injecting a chemical slug containing an active aqueous surfactant system or a thickened aqueous liquid, followed by an aqueous liquid into a reservoir. Generally the reservoir selected will have a significant amount of ion exchange capacity. The ionic composition of each injected fluid is adjusted to provide a ratio between the concentration of its effectively predominate monovalent cation and the square root of the concentration of its effectively predominate divalent cation. The ratio is selected to substantially match the ratio in the aqueous fluid immediately ahead of the injected fluid.

U.S. Pat. No. 4,714,113 to Mohnot, et al., discloses a technique for enhanced oil recovery using alkaline water flooding with a precipitation inhibitor. The waterflood injection fluid includes an alkali and a water-soluble precipitation inhibitor that can prevent divalent cations from precipitating. Beyond the immediate vicinity of the injection well, the permeability characteristics of the reservoir are modified by precipitation of divalent metal hydroxides or divalent metal carbonates.

U.S. Pat. No. 4,466,892 to Chan, et al., discloses a method for caustic flooding of a reservoir using a stabilized water. The stabilizer is a lignosulfonate material that is blended with the injection water before the addition of an alkaline chemical. The lignosulfonate prevents the formation of precipitates due to hydroxides.

U.S. Pat. No. 4,828,031 to Davis discloses a method for recovering oil from diatomite. In the method, a solvent is injected into a diatomite followed by an aqueous surfactant solution. The solution contains a diatomite/oil water wettability improving agent and an oil/water surface tension lowering agent.

U.S. Patent Application Publication No. 2007/0215351 by Wernli, et al., discloses the use of phosphorus and nitrogen containing formulations in secondary oil recovery operations. The phosphorous and nitrogen is generally in the form of ions, such as phosphate and ammonium ions, among others.

Many of the studies discussed above, however, focused on sand-based reservoirs and not carbonates. More recently, there have been a few studies investigating the effect of injecting low salinity water in carbonates. For example, Yousef, A. A., Al-Saleh, S, Al-Kaabi, A., and Al-Jawfi, M., "Laboratory Investigation of Novel Oil Recovery Method for Carbonate Reservoirs," SPE 137634, presented at Canadian Unconventional Resources and International Petroleum Conference, Calgary, Canada, 19-21 Oct., 2010 investigated the effect of using diluted sea water as injection water in Middle East limestone cores. Significant uplifts, e.g., 18 to 19% OOIP additional oil recovery, have been measured and attributed to low salinity effects the study.

Alotaibi, M. B., Nasralla, R. A., and Nasr-El-Din, H. A., "Wettability Challenges in Carbonate Reservoirs," SPE 129972, presented at SPE Improved Oil Recovery Symposium, Tulsa, Okla., 24-28 Apr. 2010, also studied salinity effects in Middle East limestone cores in corefloods, but reported inconclusive results.

Bagci, S., Mustafa, V. K., and Turksoy, U. "Effect of brine composition and alkali flood in the permeability damage of limestone reservoirs," SPE 65394, presented at SPE International Symposium on Oilfield Chemistry, Houston, Tex., 13-16 Feb. 2001, studied the effect of brine salinity on oil recovery in unconsolidated limestone packs with Garzan crude oil. Bagci, et al., studied waterflood performance of various concentrations and combinations of KCl, NaCl, and CaCl2 brine. No definite low salinity effect was observed for unfractured limestones in that study. On the other hand, it has been known for over 50 years injecting low salinity water can have positive effects for some clastic reservoirs.

The improved oil recovery from varied waterflooding experiments has been attributed to a number of possible fundamental mechanisms. One leading theory, proposes that wettability alteration towards water-wet condition is the dominating mechanism for uplift in oil recovery for enhanced waterflood in carbonates. For example, in Webb, K. J., Black, C. J. J., and Tjetland, G., "A laboratory study investigating methods for improving oil recovery in carbonates" SPE 10506-MS, presented at the International Petroleum Technology Conference, 21-23 Doha, Qatar, November 2005, the authors presented capillary pressure curves measured during waterflood experiments on Valhall reservoir limestone cores at reservoir conditions. They observed that water-wetting characteristics of the studied rock increased after flooding with brine containing sulfate. They noted that sulfate was initially absent in both formation brine and the secondary injection brine. The increase in water-wetness was manifested as an increase in the positive part of the capillary pressure curve. In addition, in the Austad studies, in their work with chalk/limestone over the last ten years, the increased oil recovery in carbonate rock has been attributed to wettability alteration towards water-wetness.

While waterflooding has been used to enhance oil recovery, significant portions of the original oil in place is still left in the reservoir after conventional waterflooding techniques. Accordingly, the need exists for improved systems and methods of waterflooding a reservoir to recover still greater portions of the original oil in place. It will be easily understood that while increasing the percentage recovery by even 1-2% of the original oil in place (OOIP) may seem small in terms of percentages, the incremental improvement is significant both in terms of the improvement over the conventional techniques and in the improvement to the economies of a hydrocarbon recovery operation.

Further information may be found in at least in Hallenbeck, L. D., Sylte, J. E., Ebbs, D. J., and Thomas, L. K., "Implementation of the Ekofisk Field Waterflood," SPE Formulation Evaluation, 6, 284-290 (1991); Lager, A., Webb, K. J., Black, C. J. J, Singleton, M., and Sorbie, K. S., "Low Salinity Oil Recovery—An Experimental Investigation," presented at the International Symposium of the Society of Core Analysis, Trondheim, Norway, 12-16 Sep., 2006; Sylte, J. E., Hallenbeck, L. D., and Thomas, L. K., "Ekofisk Formation Pilot Waterflood," SPE 18276, presented at SPE Annual Technical Conference and Exhibition, Houston, Tex., 2-5 Oct. 1988; Taber, J. J. and Martin, F. D., "Technical Screening Guides for the Enhanced Recovery of Oil", SPE 12069, presented at SPE Annual Technical Conference and Exhibition, San Francisco Calif., 5-8 Oct. 1983; Verma, S., Adibhatla, B., Leahy-Dios, A., and Willingham, T., "Modeling Improved Recovery Methods in an Unstructured Grid Simulator", presented at the International Petroleum Technology Conference, Doha, Qatar, 7-9 Dec., 2009.

SUMMARY

An embodiment provides a method for enhancing oil recovery from a subterranean formation. The method includes adding a first salt to a first aqueous stream to form a first injection stream with an increased concentration of a first ion and adding a second salt to a second aqueous stream to form a second injection stream with increased concentration of a second ion. The second injection stream is of substantially different composition than the first injection stream and the first injection stream and the second injection stream have substantially the same interfacial tension with a hydrocarbon and substantially the same kinematic viscosity. The first injection stream is injected into the subterranean formation at a first time and the second injection stream is injected into the subterranean formation at a second time. The first injection stream and second injection stream contact at least some overlapping portion of the subterranean formation. Oil is recovered from the overlapping portion of the subterranean formation.

Various techniques may be used for adding the salts. For example, adding the first salt, the second salt, or both, may include making a concentrated solution from a solid salt and adding the concentrated solution to an aqueous stream. Further, adding the first salt, the second salt, or both, may include adding a solid salt to an aqueous stream.

Some properties of the two injection streams may be similar. For example, the kinematic viscosity of the second stream may be within about 30% of the first injection stream as measured at a common temperature and shear rate. Further, the interfacial tension of the second injection stream with a hydrocarbon may be within a factor of three of the first injection stream as measured at the same temperature.

However, compositions properties of the two streams may differ in the method, a concentration of an ion may be than about 2,000 ppm different between the first injection stream and the second injection stream. Further, a different salt may be selected for the first ion and the second ion.

Numerous techniques may be used to inject the streams. The first injection stream and the second injection stream may be injected into the formation via a single well completed within the formation. Further, the first injection stream, the second injection stream, or both may be injected into the subterranean formation via a well completed within a watered out zone of the formation (e.g., into a residual oil zone of the formation or a zone that has already been waterflooded). The first injection stream may be injected through a first wellbore; and the second injection stream may be injected through a second wellbore.

Any number of techniques may be used to form the streams. A formation water stream may be split to form the first aqueous stream and the second aqueous stream. An aqueous stream may be formed by reducing an ion concentration in another aqueous stream. The first salt, the second salt, or both, may include borates, phosphates, silicates, nitrates, carbonates, citrates, acetates, or sulfates, or any combinations thereof. For example, a phosphate may added in a concentration that is greater than about 1,000 ppm and less than about 10,000 ppm. A borate may added in a concentration that is greater than about 5,000 ppm and less than about 22,500 ppm, or in a concentration greater than about 5,000 ppm and less than about 13,500 ppm. A concentration of a selected ion may be adjusted to at least 1 gram of ion per kg of aqueous solution.

The streams may be formed differently. A concentration of another ion may be reduced in the first aqueous stream. The pH of the first aqueous stream may be set to at least 1 pH point different from the second aqueous stream. The concentration of the first ion in the first injection stream may be set at least 1000 ppm higher than the concentration of the same ion in the second injection stream. Further, the concentration of the second ion in the second injection stream may be set at least 1000 ppm higher than the concentration of the same ion in the first injection stream. An aqueous stream, or an injection stream, or both, to remove at least a portion of dissolved calcium ions, dissolved magnesium ions, or both.

A third salt may be added to a third aqueous stream to form a third injection stream, and the third injection stream may be injected into the subterranean formation at a third time subsequent to the first and second times. The third salt may be the same as the first salt. The composition of the first injection stream may be the same as the third injection stream.

Another embodiment provides a system for enhancing oil recovery from a subterranean formation. The system includes comprising: a first injection solution comprising a first salt added to a first aqueous stream; a second injection solution comprising a second salt added to a second aqueous stream, wherein the first injection solution and the second injection solution have substantially the same interfacial tension with a hydrocarbon and substantially the same kinematic viscosity; an injection well to the subterranean formation; an injection system configured to inject the first injection solution and the second injection solution into the subterranean formation so that the first injection solution and the second injection solution contact a common portion of the formation. A production well is configured to produce fluids from the common portion of the subterranean formation and a separation system configured to separate the fluids into an aqueous stream and a hydrocarbon stream.

The different injection solutions may have a number of similar properties. The kinematic viscosity of the second injection solution may be within about 30% of the first injection solution as measured at a common temperature and shear rate. The interfacial tension of the second injection solution may be within a factor of three of the first injection solution as measured against a hydrocarbon at the same temperature.

The injection solutions may be substantially different in composition. For example, a concentration of an ion may be at least 2,000 ppm different between the first injection solution and the second injection solution. Either the first salt or the first salt may include a borate, phosphate, silicate, nitrate, carbonate, citrate, acetate, or sulfate, or any combinations thereof. The first salt and the second salt may include the same ion, but the concentration of the same ion in the second injection solution is higher than the concentration of the same ion in the first injection solution. The second injection solution may have a total salinity of less than about 33% of the first injection solution. The pH of an injection solution may be less than about 8. The second injection stream may have a total salinity of greater than about 10,000 ppm.

A number of configurations of subterranean formations and wells may be used in embodiments. An average subterranean formation temperature may be greater than about 130° F. (about 54° C.). Separate injection wells may be used for the first injection solution and the second injection solution. A single well bore may be used for both injection and production.

DESCRIPTION OF THE DRAWINGS

The advantages of the present techniques are better understood by referring to the following detailed description and the attached drawings, in which.

DETAILED DESCRIPTION

Figure 1:
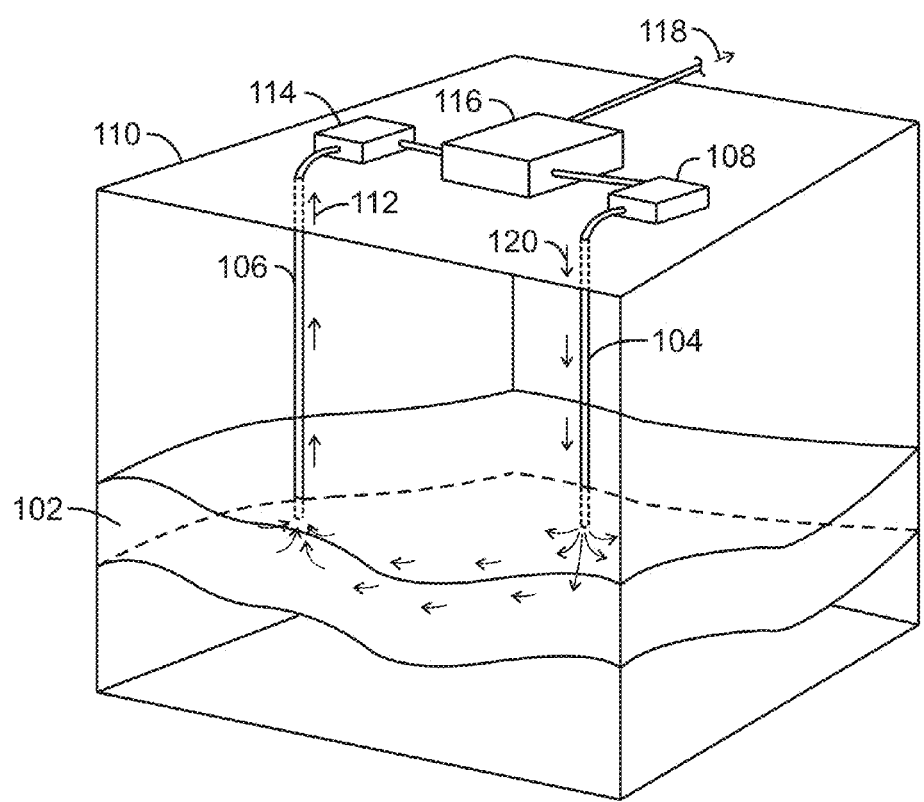
FIG. 1 is a schematic diagram of a waterflood process that may be used to increase oil production from a reservoir.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

A "hydrocarbon" is an organic compound that primarily includes the elements hydrogen and carbon although nitrogen, sulfur, oxygen, metals, or any number of other elements may be present in small amounts. As used herein, hydrocarbons generally refer to organic materials that are harvested from hydrocarbon containing sub-surface rock layers, termed reservoirs. For example, natural gas is a hydrocarbon.

"Interfacial tension" is a measurement of the surface energy present at an interface between two liquid phases that exhibit a phase boundary, such as an aqueous phase and a hydrocarbon phase. A high interfacial tension value (e.g., greater than about 10 dynes/cm) may indicate the inability of one fluid to mix with a second fluid to form a fluid emulsion. Interfacial tension may be measured at a known or fixed temperature and pressure using any number of techniques and systems know in the art, including, for example, spinning drop tensiometers, pendent drop techniques, and the like. Comparisons described herein were measured using a pendent drop method at the same pressure and temperature conditions, e.g., at reservoir conditions of about 30-90° C., or higher, and 1-4 atms., or higher.

The term "natural gas" refers to a multi-component gas obtained from a crude oil well (associated gas) or from a subterranean gas-bearing formation (non-associated gas). The composition and pressure of natural gas can vary significantly. A typical natural gas stream contains methane ($C_1$) as a significant component. Raw natural gas will also typically contain ethane ($C_2$), higher molecular weight hydrocarbons, one or more acid gases (such as carbon dioxide, hydrogen sulfide, carbonyl sulfide, carbon disulfide, and mercaptans), and minor amounts of contaminants such as water, nitrogen, iron sulfide, wax, and crude oil. As used herein, natural gas includes gas resulting from the regasification of a liquefied natural gas, which has been purified to remove contaminates, such as water, acid gases, and most of the higher molecular weight hydrocarbons.

"Pore volume" refers to the swept volume between an injection well and a production well and may be readily determined by methods known to the person skilled in the art. Such methods include modeling studies. However, the pore volume may also be determined by passing a high salinity water, including a tracer, through the formation from the injection well to the production well. The swept volume is the volume swept by the displacement fluid averaged over all flow paths between the injection well and production well. This may be determined with reference to the first temporal moment of the tracer distribution in the produced high salinity water, as would be well known to the person skilled in the art.

"Pressure" is the force exerted per unit area by a fluid, including hydrocarbon, water or mixtures, on the walls of a volume. Pressure can be shown as pounds per square inch (psi). "Atmospheric pressure" refers to the local pressure of the air. "Absolute pressure" (psia) refers to the sum of the atmospheric pressure (14.7 psia at standard conditions) plus the gage pressure (psig). "Gauge pressure" (psig) refers to the pressure measured by a gauge, which indicates only the pressure exceeding the local atmospheric pressure (i.e., a gauge pressure of 0 psig corresponds to an absolute pressure of 14.7 psia). The term "vapor pressure" has the usual thermodynamic meaning For a pure component in an enclosed system at a given pressure, the component vapor pressure is essentially equal to the total pressure in the system.

A "subterranean formation" and/or "subsurface formation" means a subsurface region, regardless of size, comprising an aggregation of subsurface sedimentary, metamorphic, and/or igneous matter, whether consolidated or unconsolidated, and other subsurface matter, whether in a solid, semi-solid, liquid, and/or gaseous state, related to the geological development of the subsurface region. A formation may contain numerous geologic strata of different ages, textures, and mineralogic compositions. A subterranean formation may include a subterranean, or subsurface, reservoir that includes oil or other gaseous or liquid hydrocarbons, water, or other fluids. A subterranean formation may include, but not limited to geothermal reservoirs, petroleum reservoirs, sequestering reservoirs, and the like.

A "salt" is an "ionic compound derived from a variety of organic and inorganic counter ions well known in the art. The ions may include such cations as sodium, potassium, calcium, magnesium, ammonium, tetraalkylammonium, and the like. The salts may also such anions as borate, phosphate, silicate, nitrate, carbonate, citrate, acetate, sulfate, and the like.

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

Overview

Embodiments described herein provide methods and systems for enhancing oil production through control of ion concentrations in waterflood solutions. The methods, referred to herein as Advanced Ion Management (AIM) techniques, are implemented by selectively adding or removing ions from injection brines to enhance oil recovery compared to formation brines, e.g., connate water. In some embodiments, the techniques can use sequential injections of solutions having different ions or different concentrations of ions. In various embodiments, a staged enhancement may be used in which ions recovered with produced fluids from one region of a reservoir are used to form injection solutions for other regions of the reservoir. In another embodiment, at least a portion of divalent or multivalent ions can be replaced with monovalent ions prior to injection of the resulting fluid. These techniques can be combined in various aspects of the AIM techniques depending on the properties of the particular fields. For example, a produced connate water may be treated to replace a portion of the divalent ions with monovalent ions. Other salts may be mixed in to form different solutions for sequential injection, and the produced fluids may be used in other regions of a reservoir. As discussed below, tests of oil recovery from experimental cores were performed as different ions were added or removed from the waterflooding brine. The results of the waterflooding with different ions was compared and used to develop systems and methods for optimizing the enhancement of the oil recovery. Without being bound by presently held theories, it is currently believed that the fluids and compositions of the AIM techniques can enhance oil recovery through one or more of the following mechanisms: partial rock dissolution; surface ion exchange; and in-situ generation of surfactants. The techniques disclosed herein may function at any temperatures, but may operate more efficiently at temperatures greater than about 100° F. (38° C.), e.g., as found in many reservoirs.

As discussed below, the AIM techniques may be implemented in many ways in field operation, which may depend on a variety of factors, such as the geochemistry of the formation and the chemistry of the available water supplies. To assist in understanding the extent and scope of the present AIM techniques, examples of waterflooding and systems that may be used in waterflooding are discussed with respect to FIGS. 1-5. Examples of methods that may be used to implement the techniques are discussed with respect to FIGS. 6-8. FIGS. 9-23 present experimental techniques used to demonstrate some of the concepts embodied in the AIM systems and methods.

FIG. 1 is a schematic diagram of a waterflood process 100 that may be used to increase oil production from a reservoir. In the schematic 100, a reservoir 102 may be accessed by an injection well 104 and a production well 106. Although shown as vertical wellbores, it will be clear that any configuration of vertical and horizontal wellbores may be used. The reservoir is a subsurface formation that can contain hydrocarbons. Injection fluid, such as an aqueous solution of ions, may be injected through the injection well 104, for example, from a pumping station 108 at the surface 110. At the same time, production fluids 112, such as a hydrocarbons and aqueous solutions, are harvested from the reservoir 102, for example, through another pumping station 114. The production fluids 112 may be processed in a facility 116 to separate aqueous fluids from the hydrocarbons 118. The hydrocarbons 118 can be sent to other facilities for refining or further processing. The aqueous fluids may be mixed with make-up salts, and the resulting injection solution 120, may then be reinjected into the reservoir 102. The injection well and production wells are not limited to single lines to the reservoir 102, but may include multiple wells.

Figure 2:
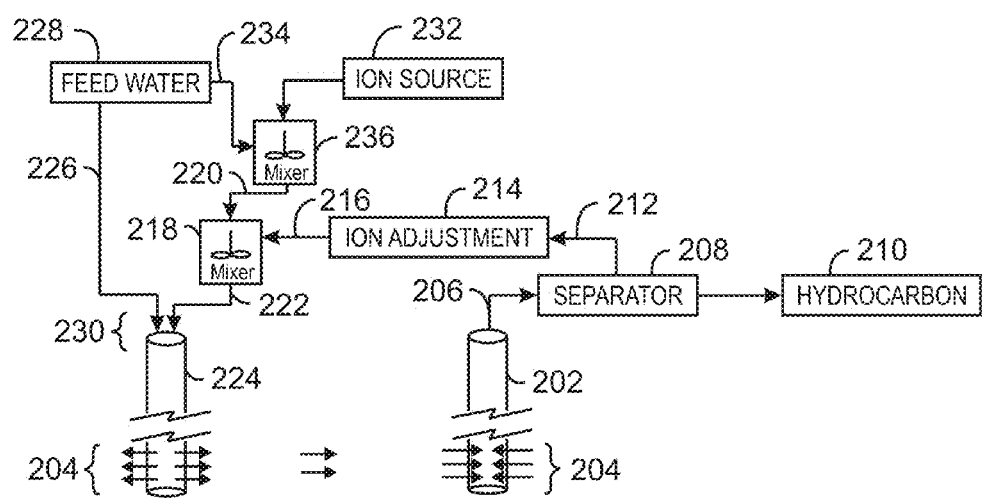
FIG. 2 is a block diagram of a waterflood process.

FIG. 2 is a block diagram of a waterflood process 200. In the waterflood process 200, a production well 202 is used to access a reservoir region 204. The produced fluids 206 may be flowed through a separator 208 to separate hydrocarbons 210 from aqueous fluids 212. The separator 208 may include, for example, a settling tank, a large pressurized vertical vessel, or a large drum designed to separate fluid phases (e.g., oil, gas, and aqueous) based on differences in density. The aqueous fluid 212 may flow through an ion adjustment system 214, in which ion concentrations may be adjusted by removing ions, replacing ions, precipitating ions, or adding ions. The ion adjustment system 214 may include an ion exchange resin, a precipitator, a flocculation tank, a forward osmosis unit, a reverse osmosis unit, a solids feeder to add salts, mixed bed reactors, ion exchange membranes, and the like. The ion adjustment system 214 may also include an ion analysis system, such as an ion chromatography unit, an electrochemical detector, and the like, as discussed below. The resulting solution 216 may be added to an injection solution mixer 218. In an embodiment, the total dissolved solids (TDS) of the water can be decreased, for example, by mixing the injection water with a lower salinity source water, such as aquifer water, lake water, stream water, catchment water, or water from other sources of fresh or lower salinity water. The lower salinity water can also be obtained by decreasing the salinity by using reverse osmosis or forward osmosis.

In an embodiment, the hardness of the water, e.g., the concentration of multivalent ions, such as calcium, magnesium, manganese and iron, can be decreased by using an ion exchange resin to replace the multivalent ions with hydrogen, sodium, or potassium. The hardness may also be decreased by precipitating the hard water ions out of solution by adding a salt that contains silicates, carbonates or similar anion which can remove Ca and Mg from solution through precipitation. In an embodiment, the ratio of the ions can be changed to promote oil recovery. Specifically, the calcium and magnesium ratios can be changed to cause additional oil recovery.

In the injection solution mixer 218, a solid salt or a mother solution 220, for example, a concentrated solution of a salt, may be added to adjust the concentration of an ion and prepare an injection solution 222. The injection solution 222 may then be injected to the formation 204 through an injection well 224. The injection solution 222 may be mixed with a stream 226 of feed water 228 at the well head 230 or in a trunk line or distribution line leading to the well head, for example, using a static mixer. In some embodiments, the mother solution 220 may also be blended with the feed water stream 226 at the well head 230 or in a trunk line or distribution line leading to the well head, for example, using a static mixer.

The mother solution 220 may be formulated by mixing an ion source 232, such as a solid salt or salt slurry, with another stream 234 of feed water 228 in a second mixer 236. Either of the injection solution mixer 218 and the second mixer 236 may be a batch tank mixer, a continuous stirred tank reactor, or a solid salt feed located upstream of a static mixer.

To obtain the correct solution concentration, a number of feedback mechanisms can be used to ensure that the desired salt concentration is obtained and maintained. One process includes taking periodic samples from the flow stream, either from the mother solution 220 or the injection solution 222, at one or more points along the flow process. Various embodiments may include sampling the concentration at the mixers 218 and 236, from the distribution system, at the well head 230, or from within the well 224. The measurements can then be used to adjust ion concentrations to ensure that targeted concentrations are achieved and maintained. Measurements could be either automated or manual, and could use an inline or stand alone detector to measure conductivity, salt/ion concentration, pH, density, absorbance, scattering, NMR, radioactive adsorption, radioactive emission, temperature or other measurement process to provide feedback on the concentration or quality of the solution. The solution concentration could then be controlled, for example, by changing the mixing rate or solution concentration.

There are several possible processes that may occur as a result of a salt being added to the displacing fluid which may help in liberating crude oil during a flood. Specifically, the salts can react with the fatty or natural acids in the crude oil to form in-situ surfactants. In crude oils, reactions with carboxylic and naphthenic acids are considered the primary source for in-situ surfactant generation. The surfactants may be generated at the interface between the oil and the displacing fluid, and can cause a reduction in the interfacial tension (IFT). The surfactant can also lead to a change in the wetability between the oil and the rock substrate which may also contribute to enhanced recovery and the liberation of crude oil.

The latter process has been described as a "rolling up" of the oil due to the in-situ surfactant causing the oil to less favorably wet the surface. Through the addition of a salt or salts, it is also possible to change the surface charge or zeta potential of the rock substrate towards a more neutral or negative state. This then results in a reduction in the attraction between the crude oil and rock substrate. There can also be a direct competition between the polar compounds in the crude oil, e.g., carboxylic acids or naphthenic acids, among others, and the anions that are added to the displacing fluid as part of the salt. This direct competition can result in crude oil being desorbed from the surface. Further, it is possible to promote dissolution of the carbonate material, for example, by changing the ion composition, such as by adding specific salts, by decreasing the total dissolved solids concentration, by decreasing the hardness of the water, or by changing the relative ion concentrations. The dissolution may result in additional oil being desorbed from the surface and hence allowing increased recovery. While the above mechanisms describe some of the processes that may occur, they in no way represent all the process that occur, or limit the scope of the invention in any way. It will be clear that the waterflood process is not limited to a single injection well 224 and a single production well 202, but can often be implemented using a number of wells configured to access a region of the reservoir.

Figure 3:
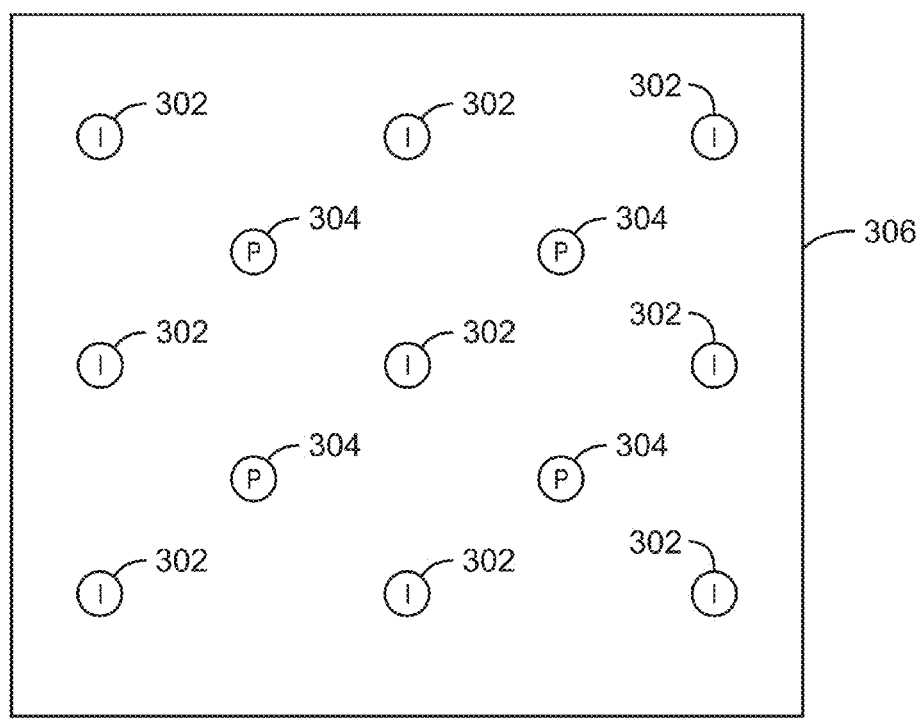
FIG. 3 is a diagram of one pattern of wells that can be used to implement a waterflood process for a region in a reservoir.

FIG. 3 is a diagram of one pattern 300 of wells 302 and 304 that can be used to implement a waterflood process for a region in a reservoir. In the pattern 300, injection wells 302 may be interspersed with production wells 304 so that a region 306 of the reservoir is provided with enough wells to access the region 306. Although the pattern 300 shown is regular, it will be clear that uneven patterns may be used as needed to reach a region of a reservoir. The techniques may be used across more than one region of a reservoir, for example, with separated aqueous fluids containing injected ions recycled to other regions of the field, with our without adjusting the ion concentration.

Figure 4:
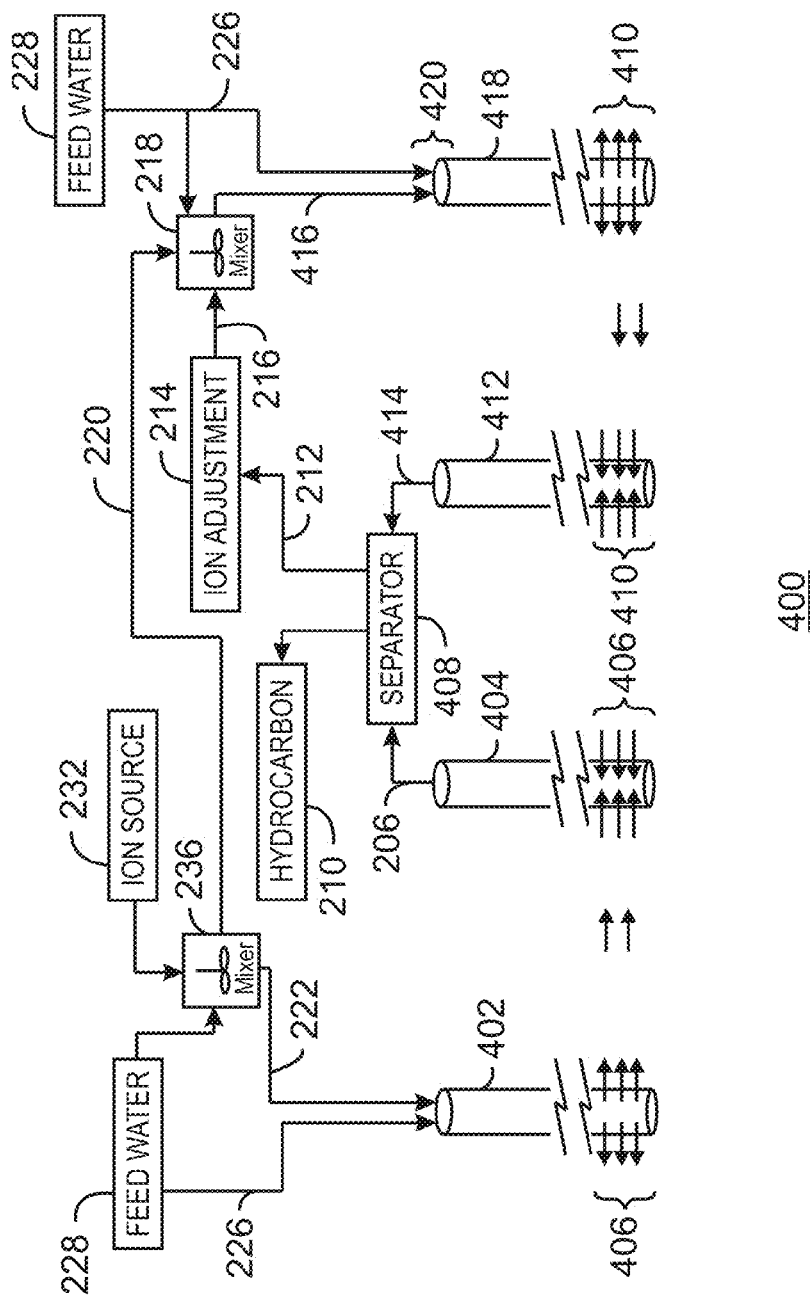
FIG. 4 is a block diagram of a staged waterflood process.

FIG. 4 is a block diagram of a staged waterflood process 400. In FIG. 4, like numbered units are as described with respect to FIG. 2. In FIG. 4, a first injection well 402 and a first production well 404 are completed to a first region 406 of a reservoir. The injection well 402 is used to inject a waterflood or injection solution 222 into the first region 406. Fluids 206 are produced from the first region 406 through the production well 404. As discussed with respect to FIG. 2, the produced fluids 206 are passed to a separator 408 which separates the fluids 206 into hydrocarbons 210 and an aqueous fluid 212.

A second region 410 of the reservoir may be accessed by a second production well 412, which may be used to produce fluid 414 from the second region 410. The fluid 414 from the second region 410 may be passed to the same separator 408, or to another separator, for separation of the hydrocarbons 210 from the aqueous fluid 212. The aqueous fluid 212 from the first region 406 and the second region 410 may be processed in an ion adjustment system 214 to remove or replace ions, to analyze concentrations for adjustment, or both. The resulting solution 216 can be sent a mixer 218 in which a mother solution 220 can be used to increase a concentration of one or more ions. The ion adjusted solution 416 may then be injected back into the second region 410 through a second injection well 418. As discussed with respect to FIG. 2, the injected solution 416 may be mixed with a stream 226 of feed water 228, at the well head 420, in the mixer 218, or in the distribution system leading to the well head 420. As the aqueous stream 212 has been recovered, at least in part, after injection into the first region 406, this may allow lower costs by capturing and recycling ions from the previously injected brine for use in the second region 410 of the reservoir. The production and injection is not limited to the number of wells shown, but may include any number of wells used to efficiently access the regions of the reservoir, as discussed with respect to FIG. 5.

Figure 5:
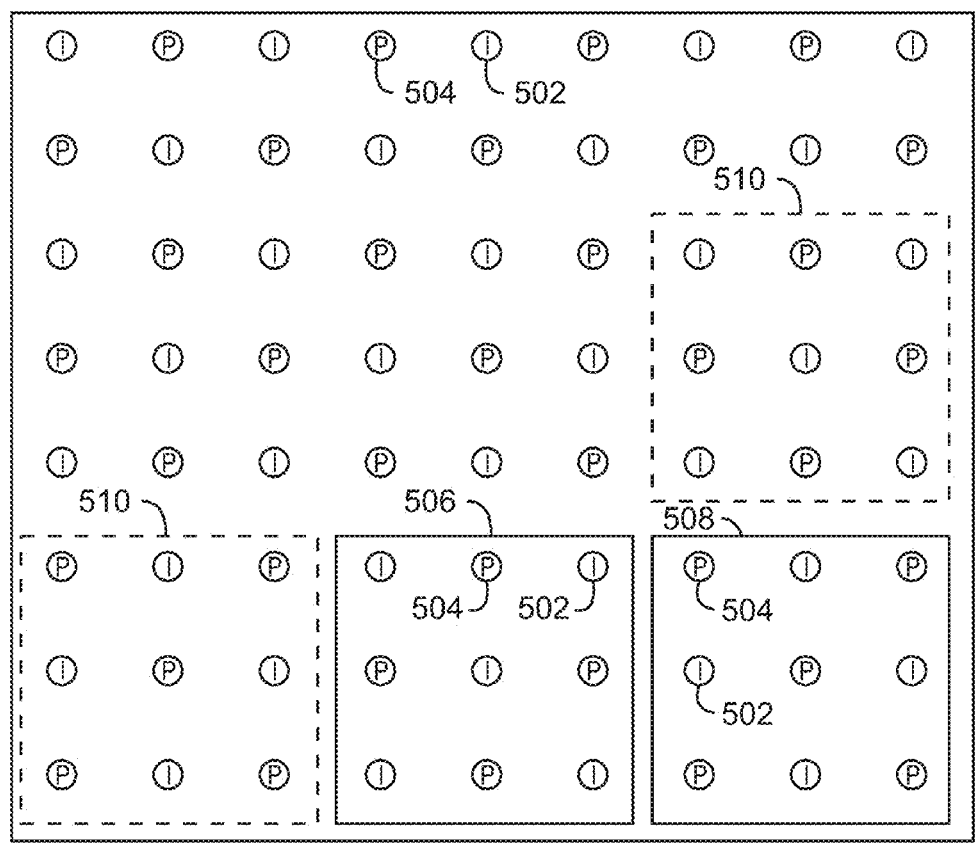
FIG. 5 is a diagram of a reservoir showing a pattern of wells that can be used to implement a staged waterflood process.

FIG. 5 is a diagram of a reservoir 500 showing a pattern of wells 502 and 504 that can be used to implement a staged waterflood process. A first region 506 of the reservoir 500 is accessed by a first set of injection wells 502 and production wells 504. A second region 508 of the reservoir 500 is accessed by a second set of injection wells 502 and production wells 504. As discussed with respect to FIG. 4, fluids produced from the first region 506 and the second region 508 can be separated into hydrocarbons and aqueous fluid. The aqueous fluid may contain at least a portion of the ions injected into the first region 506. The concentrations of the ions in the aqueous fluid may be adjusted to match selected targets, and the aqueous fluid can be injected into the second region 508 through the injection wells 502 in the second region 508. Any number of other regions may be treated this way. For example, the produced fluid from the second region 508 may be used to treat other regions 510 of the reservoir 500. Any number of methods may utilize the systems above to implement advanced ion management (AIM) for waterflooding reservoirs to enhance oil production, such as those discussed with respect to FIGS. 6-8.

Figure 6:
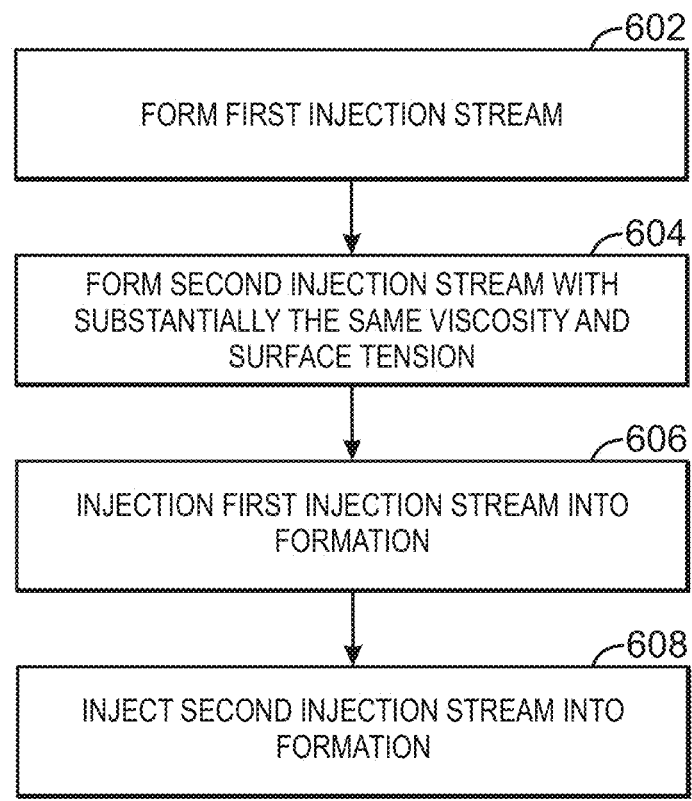
FIG. 6 is a method for performing a waterflood process using a sequential injection of ions.

FIG. 6 is a method 600 for performing a waterflood process using a sequential injection of ions. The method 600 begins at block 602 with the formation of a first injection stream by adding an ion to an aqueous stream. The first injection stream may be made using fresh water, salt water, connate water, or any combinations thereof. A salt can be mixed with the water to add the target ions. The salts can include such anions as borate, silicate, nitrate, carbonate, citrate, acetate, phosphate, or sulfate, or any combinations thereof. Generally, the cations will be monovalent, such as ions of sodium, lithium, and the like, to lower the chance of precipitation.

In field applications, as noted above, the salt can be added to the injection fluid in a number of ways including, but not limited to, by dissolution of the salt using a mixer to create a concentrated "mother solution." The mother solution can be mixed with a more dilute solution to create the desired brine concentration prior to injecting into the reservoir. Variations on mixing the mother solution with the injection fluid may include passing the mother solution and the injection fluid through a static mixer prior to injecting into a well or wells. Further, the mother solution may be injected directly into a well along with the injection fluid, where the two solutions may mix within the well bore. The mother solution and the injection fluid may be mixed in a distribution system connecting a facility to one or more injection wells. For example, the mother solution can be injected into a trunk line of the distribution system, allowing mixing within the distribution system and well bore. An augur feed system that dispenses the mother solution at a predetermined rate may be incorporated into any of the above mixing systems.

The injection stream may be mixed to a desired concentration, either in batch or in a continuous flow process. Here the salt can be mixed with the injection fluid using mixers, a baffled system, or a system where the salt is allowed to dissolve into the aqueous phase to reach the desired aqueous concentration. Concentrations that may be used for the various ions are discussed with respect to the examples, below. Injections streams may also be formed by reducing an ion concentration.

At block 604, a second injection stream may be formed with substantially the same viscosity and interfacial tension as the first injection stream. Substantially the same viscosity indicates a kinematic viscosity value that is within about a factor of 3, or within a factor of 1.5, at a reservoir temperature and shear rate characteristic of flow through the bulk of the reservoir (e.g., 1 s$^{-1}$). Such substantially similar viscosities are characteristic of fluids only differing in salinity and generally not those with added polymer viscosifiers. Comparisons are performed at common pressures, temperatures, and shear conditions, preferably those characteristic of conditions experienced within the formation of interest. Substantially the same interfacial tension indicates a value between an aqueous phase and a liquid hydrocarbon phase that is within about three times to five times or within one order of magnitude. For the solutions discussed herein, such similar values will result in little, if any, effect on the spontaneous formation of oil and water emulsions. The liquid hydrocarbon phase may include oil recovered from the formation of interest. Comparisons are performed at common pressures and temperatures, such as those characteristic of conditions experienced within the formation of interest. The differences in the viscosity and surface tension discussed above are likely too small to have any effect on flow properties and, thus, any differences in oil recovery are likely to be more influenced by ion concentration, identity, and changes.

The second injection stream may be formed using the same materials and mixing techniques as the first injection stream. The concentration of an ion in either injection stream may be set to at least about 1 gram of ion per liter of solution. The ions selected for the second injection may be the same as the first stream, or may be different. The concentrations of the ions added to the first and second injection streams may differ by about 2000 ppm or more. Further, in the first injection stream, a concentration of a first added ion may be greater than about 1000 ppm higher than the concentration of the same ion in the second injection stream. Similarly, the concentration on an ion added to the second injection stream may be set to greater than about 1000 ppm higher than the concentration of the same ion in the first injection stream. The pH of the first injection stream and the second injection stream may be the same or may be adjusted to be different. For example, the pH of one of the injection streams may be controlled to at least one pH point different from the other stream. The formation of either the first or the second stream may include reducing the ion concentration in another aqueous stream, such as the source stream. The first injection stream and the second injection stream may be formed by splitting a formation water stream into two or more portions and individually adding ions to each portion.

At block 606, the first injection stream can be injected into a subterranean formation, for example, into a reservoir, into a water leg below the reservoir, or a watered out zone of the reservoir (e.g., residual oil zone or zone that has already been water flooded). At block 608, the second injection stream can be injected into the same subterranean formation at a different time, for example, to sequentially contact the same formation as the first injection stream. The second injection stream may be injected through the same wellbore as the first injection stream, or may be injected into a different wellbore. Either of the injection streams may be injected into the subterranean formation in an amount that ranges from 0.1 to 2 times the pore volume (PV) of the subterranean formation. As used herein, the term "subterranean formation" may refer to a subregion of an oil-containing reservoir, for example, a subregion of areal extent defined by a polygon whose vertices correspond to the location of wells.

The pore volume of a subterranean formation is equal to total volume minus the volume occupied by rock. To calculate the PV for a region, one would take the total pore volume bound by that region, minus the volume occupied by rock within that region. For example, referring to FIG. 5, the PV of region 508 would be the total PV bound by region 508 minus the rock volume within region 508. To calculate the total PV for a subterranean formation consisting of several regions, one can sum the PVs for each region within the subterranean formation.

The techniques are not limited to only two sequential injections, but may include any number of sequential injections. For example, a third injection stream may be injected after the second injection stream. The third injection stream may differ from the second injection stream in the same ways that the second injection stream differs from the first injection stream, e.g., in ion concentration, total ion concentration, pH and the like. The third and subsequent injection streams may have substantially the same viscosity and interfacial tension as the first two injection streams. Further, the third injection stream may be the same as the first injection streams, for example, if the injection were alternating between two injection streams. The injection does not have to be performed into a same area or region in the reservoir. As noted above, fluid produced from one region of a reservoir may be injected into another area of a reservoir, as discussed with respect to FIG. 7.

Figure 7:
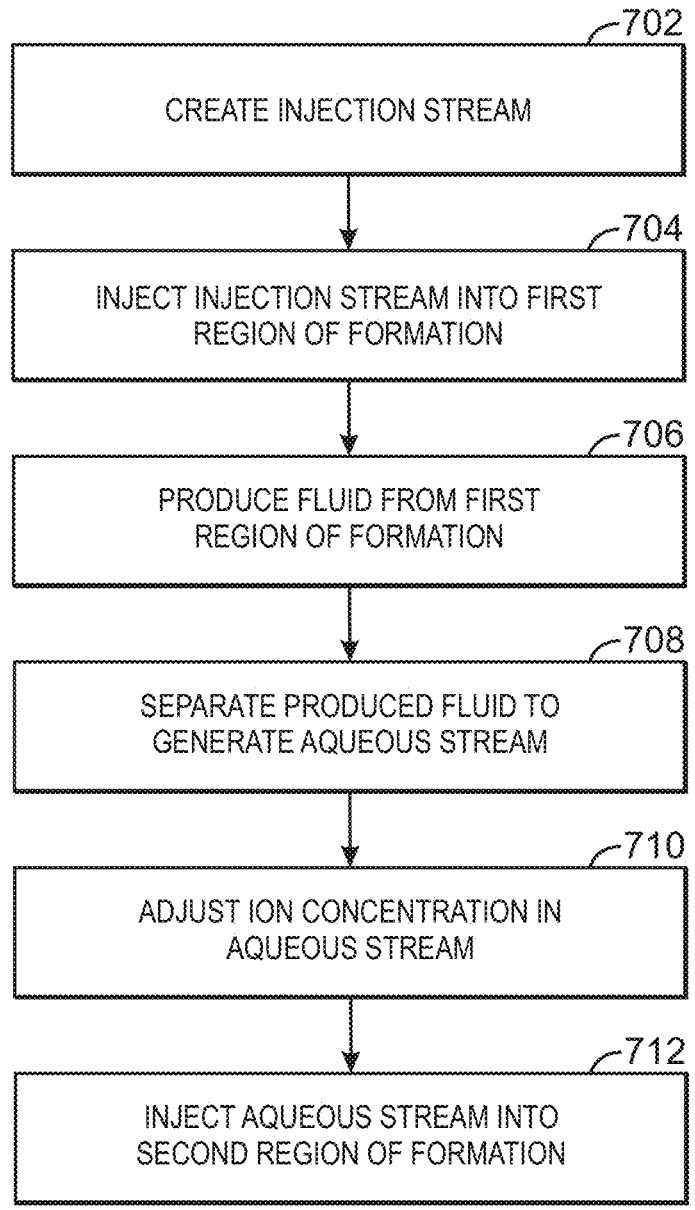
FIG. 7 is a method for performing a staged waterflood process.

FIG. 7 is a method 700 for performing a staged waterflood process. The method begins at block 702 with the creation of an injection stream. This may be performed using similar materials and methods as the injection streams discussed with respect to FIG. 6. At block 704, the injection stream can be injected into a first region of a subterranean formation. At block 706, a fluid may be produced from the subterranean formation. At block 708, the fluid may be separated to produce an aqueous stream that includes at least a portion of the ions initially injected. The ion concentration in the fluid may be measured as described herein, and at block 710, adjusted to a desired level, for example, by adding, removing, or replacing ions. At block 712, the aqueous stream is injected through a second injection well into a second region of the subterranean formation. The first region and the second region may or may not be in fluid communication. The staged waterflood process may be used in concert with the methods described with respect to FIG. 6 or 8.

Figure 8:
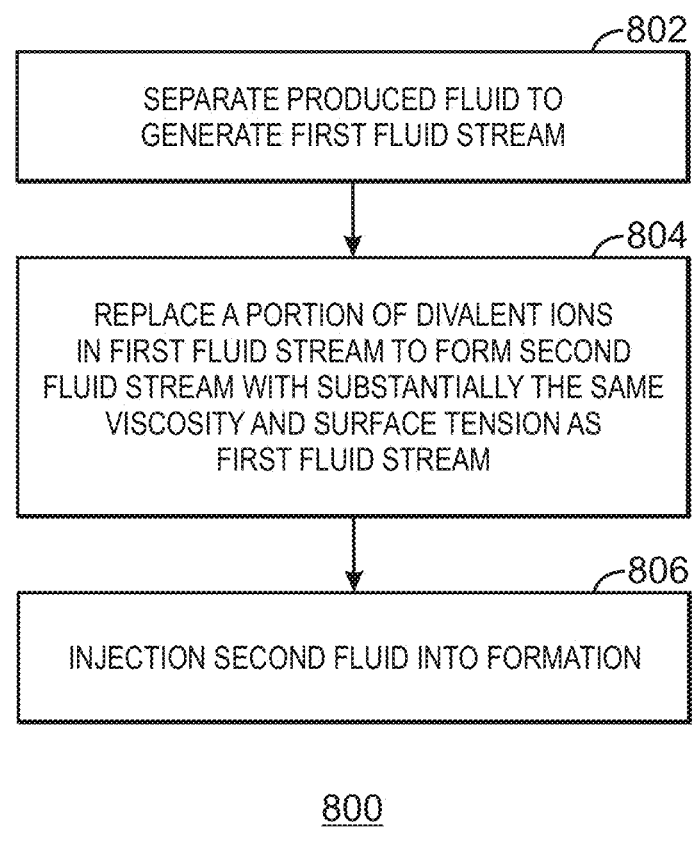
FIG. 8 is a method for performing a waterflood process using ion replacement.

FIG. 8 is a method 800 for performing a waterflood process using ion replacement. The method 800 begins at block 802, wherein a fluid produced from a subterranean formation is separated to form a first fluid stream comprising an aqueous stream. At block 804, at least a portion of divalent ions in the first fluid stream are replaced, for example, with monovalent ions, to form a second fluid stream. The divalent ions may include cations, such as calcium and magnesium, among others, which may be replaced, for example, by flowing the first fluid stream through an ion exchange resin. As discussed with respect to FIG. 6, the second fluid stream may have substantially the same viscosity and interfacial tension as the first fluid stream. After the ion replacement, the second fluid stream may have a total concentration of ions greater than about 100,000 ppm (parts per million on a mass basis). As used herein, the term "total concentration of ions" is equivalent to the total dissolved solids as determined by the ratio of mass remaining after evaporating the water within an aqueous sample and the original mass of the sample; for example, see ASTM Standard D5907 "Standard Test Methods for Filterable Matter (Total Dissolved Solids) and Nonfilterable Matter (Total Suspended Solids) in Water". Alternatively, the total dissolved solids can be calculated by summing the concentrations of the individual ions found in solution where the individual ion concentrations are measured using standard analysis methods such as ion chromatography or inductively coupled plasma. For example, see ASTM Standard D5673-10 "Standard Test Method for Elements in Water by Inductively Coupled Plasma—Mass Spectrometry." At block 806, the second fluid stream may be injected into the subterranean formation, through the same well bore or through a different wellbore. The ion replacement process may be used in concert with the methods described with respect to FIG. 6 or 7.

EXAMPLES

A series of core flood experiments were performed to test the AIM technology and demonstrate that the technology disclosed herein may yield a significant increase in oil recovery compared to waterflooding using formation brines. To compare the uplift potential of the AIM technology with the current state-of-the-art approaches, the enhancements in oil recovery using AIM technology were compared to the incremental recoveries obtained using controls containing sulfate ions or low salinity concentrations.

Summary of Results

For the case of sulfate, incremental recoveries were obtained that ranged from 5-9% additional removal of the original oil-in-place (OOIP) over waterflood recoveries using formation brine. The effect of low salinity flooding was also tested by injecting sea water following formation water. Sea water was able to increase the oil recovery by an additional 7-9%, comparable to what has been reported previously. For comparison, a significant amount of oil was also recovered using formation water that had calcium and magnesium ions selectively removed, e.g., replaced with monovalent ions. A series of tests also demonstrated that low salinity water may not be necessary to promote enhanced recovery in carbonates and that most of the benefit can be obtained by using softened water, even in cases where the total dissolved solids (TDS) of the softened water was as high as 180,000 ppm.

To further expand on the effect of specific anions on enhanced oil recovery, a series of tailored brines were tested which were able to further enhance recovery beyond the levels obtained using sulfate, low salinity or softened water. In the tests using sulfate, oil recovery increased by around 5-9% OOIP. However, by changing the anion in the salt used in the modified injection brine from sulfate to borate, a further increase in incremental oil recovery, to over 15%, was measured. The effectiveness of incrementally increasing the borate concentration through a series of steps was also tested, and total recovery from incrementally increasing the concentration was similar (within 4%) to the recovery from increasing the salt concentration in a single step. Additional tests using phosphate further demonstrated that incremental recoveries could be pushed to over 20% OOIP, indicating that AIM has the potential to significantly enhance oil recovery.

This study shows that by tailoring the ion composition of the injection water, significant enhancements in oil recovery can be achieved. The AIM technology provides significant incremental recovery, even beyond the levels that can be obtained from the current state-of-the-art processes. Rigorously testing the process under field temperatures and pressures using Middle Eastern crude and core samples demonstrate the potential for enhanced oil recovery using AIM. Further, simulation technology can accurately capture the recoveries and pressure drop measured in the core flood experiments, suggesting simulations may provide a tool that can be used to accurately assess field-scale recoveries.

Experimental Details

Limestone and dolomite cores were used in this work. The limestone cores were obtained from a Middle Eastern reservoir, while the dolomite cores were obtained from an outcrop corresponding to a West Texas reservoir. Cores with consistent petrophysical properties were selected based on X-ray Computerized Tomography (CT), thin section petrography, and routine core analysis. All cores used in this work were 1.5 inches in diameter and about 2 inches in length. Table 1 shows the list of selected cores and their petrophysical properties. Cores D1 and D2 had substantial dolomite content, as indicated by Table 2, and had higher permeability and initial water saturation as compared to limestone cores.

TABLE 1 comparison of core properties

| Core ID. | Source | Connate Brine | Pore Volume (mL) | Porosity (%) | Swi (% PV) | Permeability (md) |
|---|---|---|---|---|---|---|
| D1 | West Texas | FW w/$SO_4^{2-}$ | 8.6 | 20.40 | 27.3 | 109.21 |
| D2 | West Texas | Modified Formation Water | 10.58 | 19.00 | 31.6 | 80.33 |
| L1 | Middle East | FW w/$SO_4^{2-}$ | 14.50 | 25.26 | 10.8 | 6.73 |
| L2 | Middle East | FW w/$SO_4^{2-}$ | 14.27 | 24.85 | 9.5 | 6.79 |
| L3 | Middle East | FW w/$SO_4^{2-}$ | 14.35 | 25.13 | 10.9 | 6.39 |
| L4 | Middle East | FW w/$SO_4^{2-}$ | 10.73 | 20.05 | 16.3 | 2.89 |
| L5 | Middle East | FW w/$SO_4^{2-}$ | 10.39 | 20.32 | 20.2 | 2.69 |
| L6 | Middle East | FW w/$SO_4^{2-}$ | 9.06 | 20.61 | 14.6 | 9.53 |

Table 2 shows X-ray diffraction analysis of the selected cores. Limestone cores consisted of more than 99% calcite, while dolomite cores were nearly 82% dolomitized.

TABLE 2

| Core ID. | QUARTZ | CALCITE | DOLOMITE | PYRITE | TALC (clay size) | KAOLINITE | CHLORITE | ILLITE + SMECTITE | SUM |
|---|---|---|---|---|---|---|---|---|---|
| D1, D2 | 1.9 | 16.4 | 81.6 | 0.0 | 0.0 | TR | 0.0 | TR | 99.9 |
| L1, L2, L3 | 0.3 | 99.2 | 0.5 | 0.0 | 0.0 | 0.0 | 0.0 | 0.0 | 100.0 |
| L4, L5, L6 | 0.3 | 99.6 | 0.0 | TR | 0.0 | 0.0 | 0.0 | 0.0 | 99.9 |

Oil from a Middle Eastern reservoir was used for all experiments. Table 3 shows the oil properties for the tests. The total acid number measured by ASTM D-664 and non-aqueous phase titration was found to be 0.11 mg KOH/g. Degassed (dead) oil was used in all experiments. The viscosity was estimated based on the equations of Kestin, et al., "Tables of the dynamic and kinematic viscosity of aqueous NaCl solutions in the temperature range 20-150 C and the pressure range 0.1-35 MPa", J. Phys. Chem. Ref. Data, Vol. 10, No. 1 (1981). All brines were synthetic, i.e., prepared in the laboratory. Table 4 shows the formulation of various brines used in this work.

TABLE 3

| Temperature (° F.) | Pressure (psi) | Viscosity (cp) | Density (g/cc) | Acid Number (mg KOH/g) |
|---|---|---|---|---|
| 72 | 14.7 | 5.92 | 0.843 | 0.11 |
| 250 | 4000 | 1.13 | 0.797 | |

As used herein, formation water may be referred to as "FW", sea water as "SW," sea water with sulfate ion selectively removed as "SW w/o $SO_4^{2-}$," sea water containing four times the usual sulfate ion concentration as "Sea water 4x $SO_4^{2-}$," formation water with calcium and magnesium selectively omitted as "FW without Ca and Mg," formation water with calcium selectively omitted as "FW without Ca," and formation water containing sulfate ion as "FW w/ $SO_4^{2-}$". Brine can be classified either as modified brine or as base or formation brine. Modified brine refers to a brine which can potentially enhance oil recovery and is injected after base brine or after another modified brine. In all experiments, formation water is used as the base brine. Modified brines were prepared by selectively adding or omitting components from formation water or sea water compositions.

TABLE 4

| | Brine Compositions (ppm) | | | | | | | |
|---|---|---|---|---|---|---|---|---|
| Ionic species | Formation Water with sulfate (FW w/$SO_4^{2-}$) | Formation Water (FW) | Modified Formation Water | Seawater (SW) | Seawater without sulfate (SW w/o $SO_4^{2-}$) | Seawater 4x $SO_4^{2-}$ | FW without Ca and Mg | FW without Ca |
| Na | 51820 | 51820 | 22828 | 10345 | 9245 | 10345 | 72591 | 70166 |
| Ca | 15992 | 15992 | 15992 | 521 | 521 | 521 | 0 | 0 |
| Mg | 1282 | 1282 | 1282 | 1094 | 1094 | 1094 | 0 | 1282 |
| K | 0 | 0 | 0 | 391 | 391 | 391 | 0 | 0 |
| Cl | 111516 | 111717 | 49274 | 18719 | 18719 | 11911 | 111852 | 111852 |
| $HCO_3$ | 391 | 391 | 172 | 0 | 0 | 0 | 391 | 391 |
| $SO_4$ | 272 | 0 | 272 | 2305 | 0 | 9222 | 0 | 0 |
| TDS | 181273 | 181202 | 89820 | 33375 | 29970 | 33484 | 184834 | 183691 |

Figure 9:
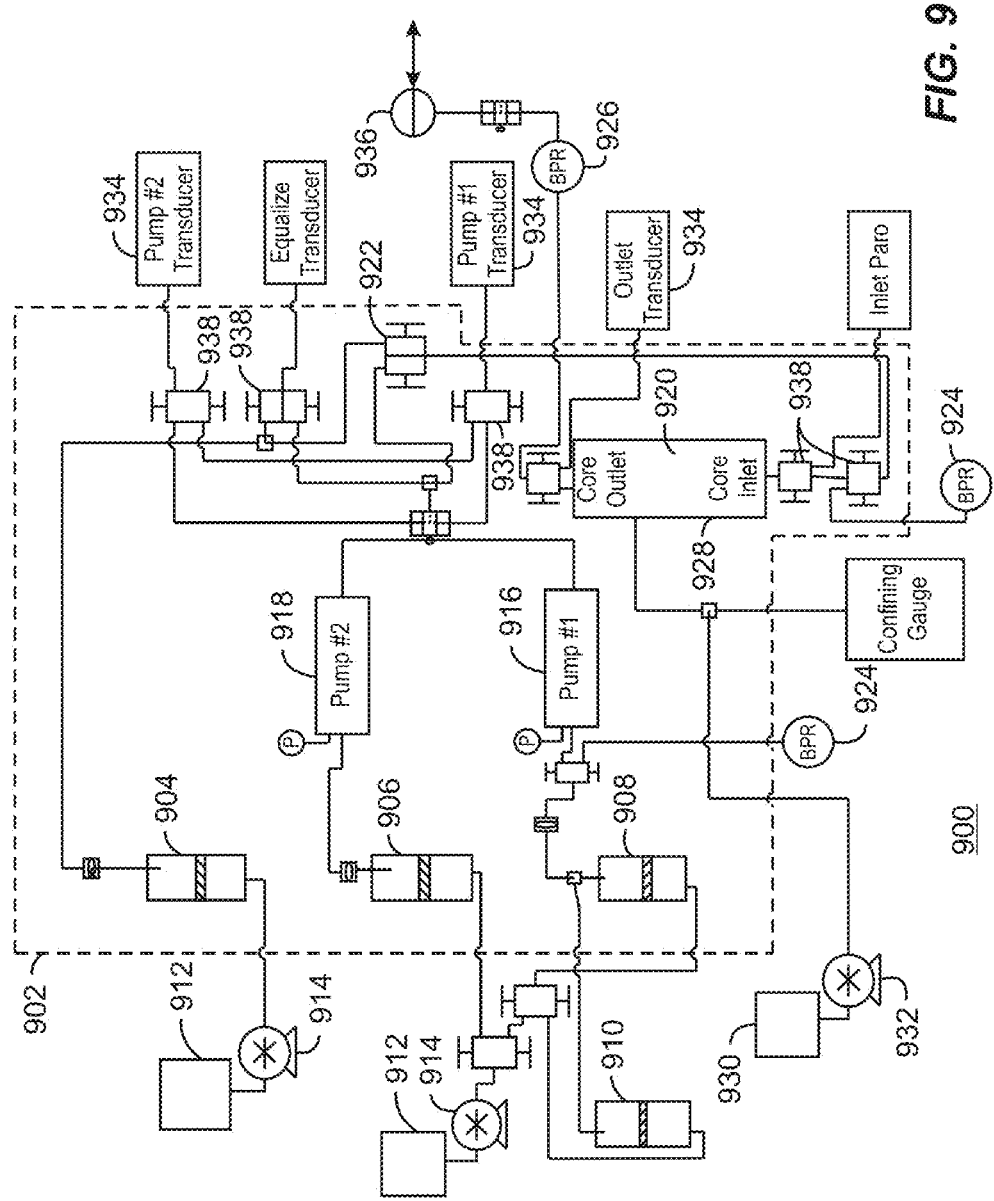
FIG. 9 is schematic representation of a coreflooding apparatus used in the experiments described herein.

FIG. 9 is schematic representation of a coreflooding apparatus 900 used in the experiments described herein. The majority of the apparatus 900 was enclosed within an oven 902 controlled at the temperature of a reservoir. Floating-piston cells were used to supply dead crude oil 904, a first modified brine 906, a formation brine 908, and a second modified brine 910. The floating-piston cells were driven by a hydraulic fluid (water) 912 from constant-pressure pumps 914 outside the enclosure. The brines were supplied to high-accuracy positive-displacement pumps, pump #1 916 and pump #2 918 for delivery to the core 920 through an oil/brine inlet valve 922. Each pump 916 and 918 comprises a pair of cylinders which can work together to deliver fluid indefinitely. Various bypass ports 924 enabled flushing and charging of lines upon fluid changeover. A back pressure regulator (BPR) 926 was used to control fluid production from the core 920.

The core 920 was mounted in a coreholder 928 which applies triaxial confining pressure using elastic end members and a rubber sleeve surrounded by a hydraulic fluid (refined oil) 930 provided by a hydraulic pump 932. Absolute pressure was measured at both ends of the core 920 by pressure transducers 934. The difference between the absolute pressures provided the pressure drop across the core 920. The core orientation was initially horizontal, but subsequent experiments used vertical flow, upward. Produced liquid was collected in an automated sample collection system 936 for oil recovery and for brine ion analysis. Selected aqueous samples were analyzed by ion chromatography. The pH of the injected brine and selected effluent was also measured. After a coreflood was complete, the core 920 was cleaned by Dean-Stark extraction and a material balance was performed on the oil.

Each core 920 was cleaned with solvents and dried. After measuring routine properties such as porosity and permeability, the core was saturated with formation brine 908 and centrifuged to obtain the desired initial water saturation. Dead crude oil (crude oil without dissolved gas) 904 was then flowed into the core 920, and the core was 920 aged at reservoir temperature for at least six weeks to restore wettability toward reservoir conditions. Before a coreflood, dead crude oil 904 was flowed through the core 920 to measure oil permeability at initial water saturation.

Each coreflood began with a conventional waterflood of formation brine 908, which may also be termed formation water, herein. Before establishing pressure communication of injection brine with the core and before switching brine compositions, a system of pressure transducers 934 and valves 938 was used to match the brine delivery pressure to the pore pressure of the core 920, in order to avoid pressure disturbances causing flow. The typical brine injection rate was 0.1 cc/min. After injecting formation brine 908, the brine was switched to a modified brine 906, and the coreflood was continued. Depending on the particular experiment, the injected brine was switched again, for example, to a second or subsequent modified brine 910 or back to the formation brine 908. Additional brine solutions could be introduced by replacing the material in the modified brine cylinder 908 or the second modified brine cylinder 910.

In all experiments, formation brine 908 was injected first until oil production ceased followed by one or many modified brines. Thus, formation brine 908 set the baseline oil recovery to compare performance of modified brines 906 and 910 injected into the same core at a later time. While the experimental set-up is at laboratory scale rather than field scale, the relative differences between waterflood compositions is expected to be representative of the order of magnitude of the impact the varying compositions would have when implemented in actual hydrocarbon recovery operations.

Figure 10:
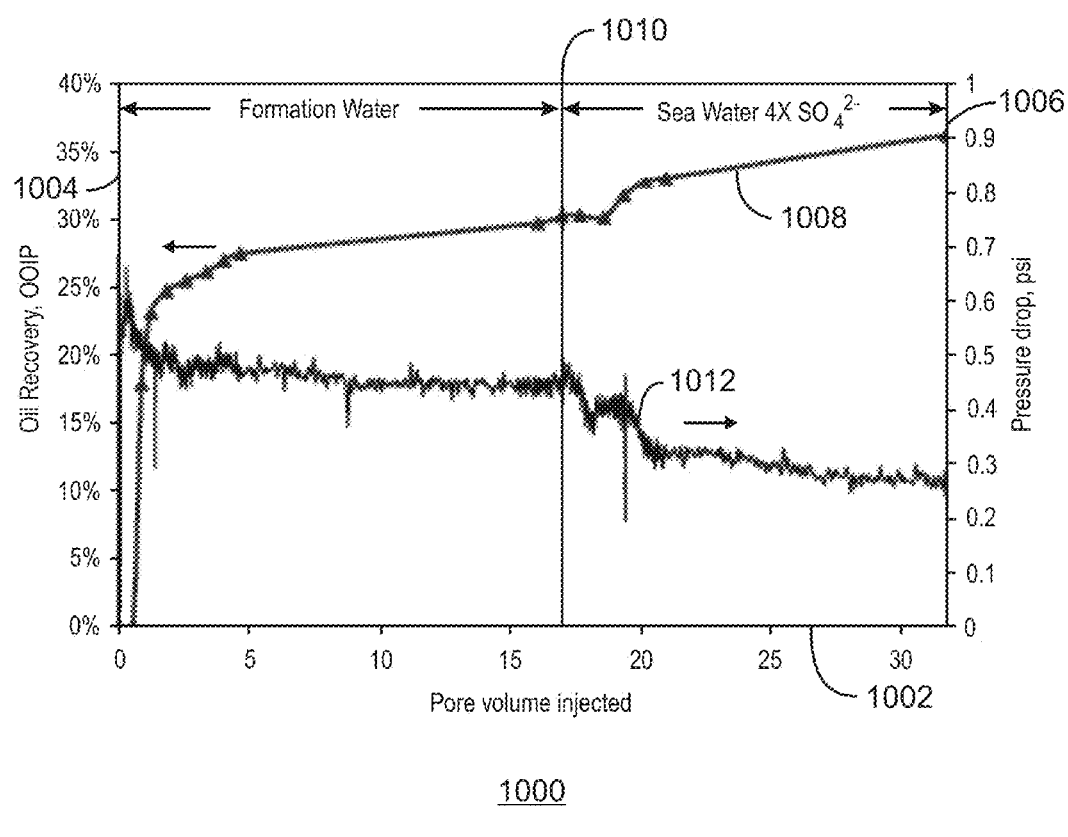
FIG. 10 is a plot of incremental oil recovery and pressure drop for core D1.
Figure 11:
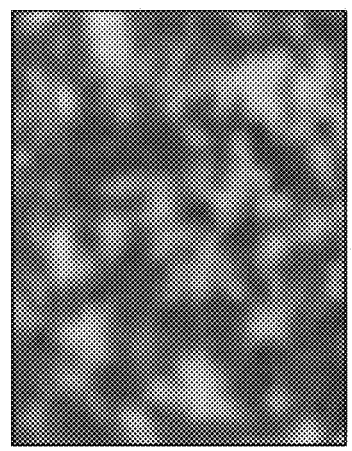
FIG. 11(A) is a CT scan image of a dolomite core (D1)
FIG. 11(B) is a CT scan image of a limestone core (L2)
Figure 11:
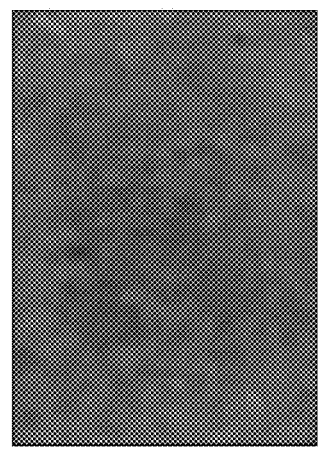

FIG. 10 is a plot 1000 of incremental oil recovery and pressure drop for core D1. In this plot 1000, the x-axis 1002 represents the volume of material injected as a multiple of the pore volume of the core plug. The left y-axis 1004 represented the oil recovered from the core as a proportion of the original oil-in-place (OOIP). The right y-axis 1006 represents the pressure drop across the core, as measured by the pressure difference between the inlet and outlet measurements.

The experiment was performed at 158° F. and 300 psi pore pressure (1200 psi net confining pressure) with the coreholder oriented horizontally. Sea water 4× $SO_4^{2-}$ was used as the modified brine. An increment of 6% OOIP recovery 1008 was obtained with sea water 4× $SO_4^{2-}$ after core D1 was flooded with formation water. Switching between the brines, as indicated at line 1010, reduced the pressure drop 1012 across core D1. Additional oil recovery (higher water saturation) and lower brine viscosity contributed to this change. Both the formation water and the sea water 4× $SO_4^{2-}$ were clear solutions at the experimental conditions.

Oil recovery 1008 with formation water alone was 30.3% OOIP, which was significantly lower than the expected range of oil recovery. Further, oil trickled out of the core for many pore volumes. Core heterogeneity was suspected to be one of the causes for this delayed oil recovery behavior. Accordingly, computer assisted tomography scans were run on example cores to determine heterogeneity, as discussed with respect to FIGS. 11(A) and (B).

FIG. 11a is a CT scan image of dolomite (D1) and FIG. 11(B) is a CT scan image of limestone (L2). The CT scan images are collectively identifies by the reference number 1100. As illustrated in FIG. 11(A), the West Texas dolomite core has significant heterogeneity, while the limestone core shown in FIG. 11(B) is relatively homogeneous. To reduce the effect of heterogeneity on oil recovery, the coreholder orientation was changed from horizontal to vertical for future experiments where brine was injected at the bottom. The changed orientation was expected to make the brine front gravity stable and to decrease heterogeneity effects. A second dolomite coreflood was performed on core D2 in vertical orientation with the same brine sequence and experimental conditions as used for core D1, as discussed with respect to FIG. 12.

Figure 12:
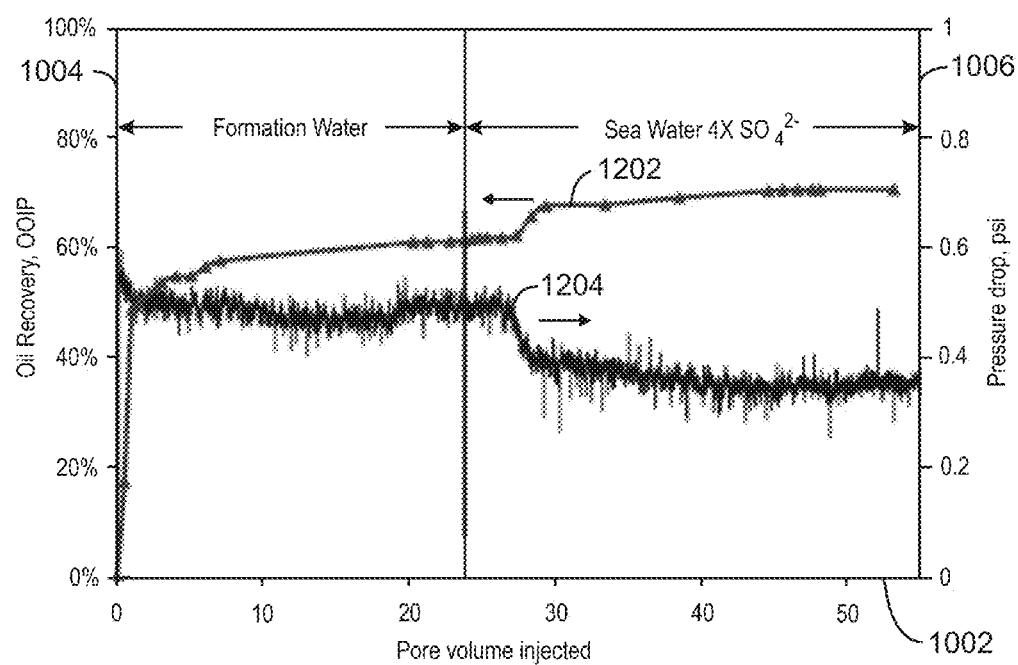
FIG. 12 is a plot of incremental oil recovery and pressure drop for core D2.

FIG. 12 is a plot 1200 of incremental oil recovery 1202 and pressure drop 1204 for core D2. The axes 1002, 1004, and 1006 are as defined with respect to FIG. 10. Connate brine for core D2 was modified formation water. Changing the coreholder orientation improved oil recovery 1202 with formation water. The oil recovery 1202 with formation water for the core in the vertical position was 61.6% compared to 30.3% for the core in the horizontal position. Both the oil recovery profile 1202 and the pressure drop profile 1204 were sharper than those obtained for core in the horizontal position (FIG. 10). An additional 9% OOIP was recovered with sea water 4× $SO_4^{2-}$, which confirms repeatability and effectiveness of the sulfate ion in improving waterflood oil recovery from dolomitized rock. Coreflood results with core D1 and D2 are summarized in Table 5. The results summarized in Table 5 and in FIGS. 10 and 12 demonstrate the present AIM techniques are effective with dolomite cores.

TABLE 5

| Core ID | Temperature (° F.) | Pressure Pore/Sleeve (psi) | Orientation (Horizontal/ Vertical) | Formation Water Recovery (OOIP) | Modified brine | AIM Recovery (OOIP) |
| --- | --- | --- | --- | --- | --- | --- |
| D1 | 158 | 300/1500 | Horizontal | 30.3% | Sea Water 4× $SO_4^{2-}$ | 6% |
| D2 | 158 | 300/1500 | Vertical | 61.6% | Sea Water 4× $SO_4^{2-}$ | 9% |

Figure 13:
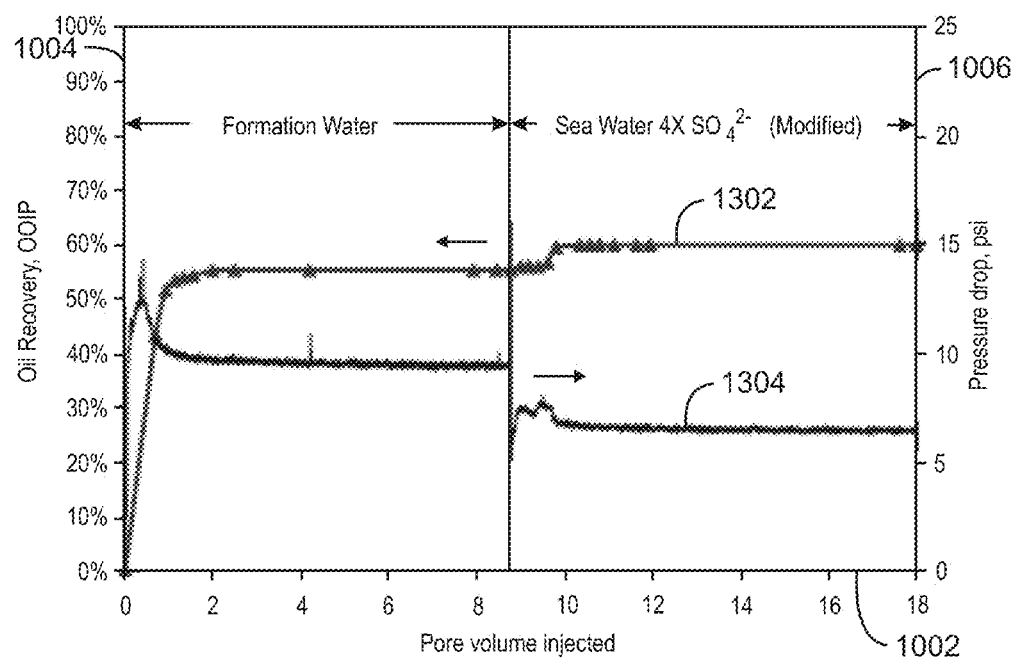
FIG. 13 is a plot of incremental oil recovery and pressure drop for limestone core L1.

FIG. 13 is a plot 1300 of incremental oil recovery 1302 and pressure drop 1304 for limestone core L1. The axes 1002, 1004, and 1006 are as defined above (FIG. 10). All experiments with Middle Eastern limestone were performed at 250° F. and 4000 psi, using a 1000 psi net confining pressure, and in a vertical orientation. Similar to dolomite cores, a coreflood was performed on core L1 to evaluate the effectiveness of sulfate in improving waterflood recovery from limestone. However at limestone coreflood conditions, anhydrite precipitation with sea water 4× $SO_4^{2-}$ was predicted. Geochemist's Workbench® (GWB) was used to estimate brine stability. Previous studies have reported no additional oil recovery with artificial sea water containing three times sulfate concentration during spontaneous imbibition experiment on a Middle Eastern limestone at 248° F. The poor brine performance was attributed to solubility problems caused by anhydrite precipitation. Hence, a modified version of sea water 4× $SO_4^{2-}$ was used for core L1 that contained extra $MgCl_2$ sufficient to minimize anhydrite precipitation. As shown in the plot 1300, formation water recovered 55.8% OOIP and was followed by sea water 4× $SO_4^{2-}$ containing extra $MgCl_2$, which recovered an additional 5.1% OOIP. The formation water injection rate was 0.1 cc/min, but the initial injection rate of modified sea water 4× $SO_4^{2-}$ was less than 0.1 cc/min. However, the injected rate of modified sea water 4× $SO_4^{2-}$ was raised to the formation water injection rate. This reduced initial flow rate is reflected in the pressure drop 1304 in FIG. 13. However, the decreased initial flow rate is not believed to have impacted the performance of modified sea water 4× $SO_4^{2-}$.

After establishing AIM effectiveness with sulfate ions for dolomite and limestone cores, the experimental efforts were expanded to identify other commercially available salts that may improve waterflood oil recovery. Several salts were tested on Middle Eastern limestone, as discussed herein. Among those that performed well are borate and phosphate.

Figure 14:
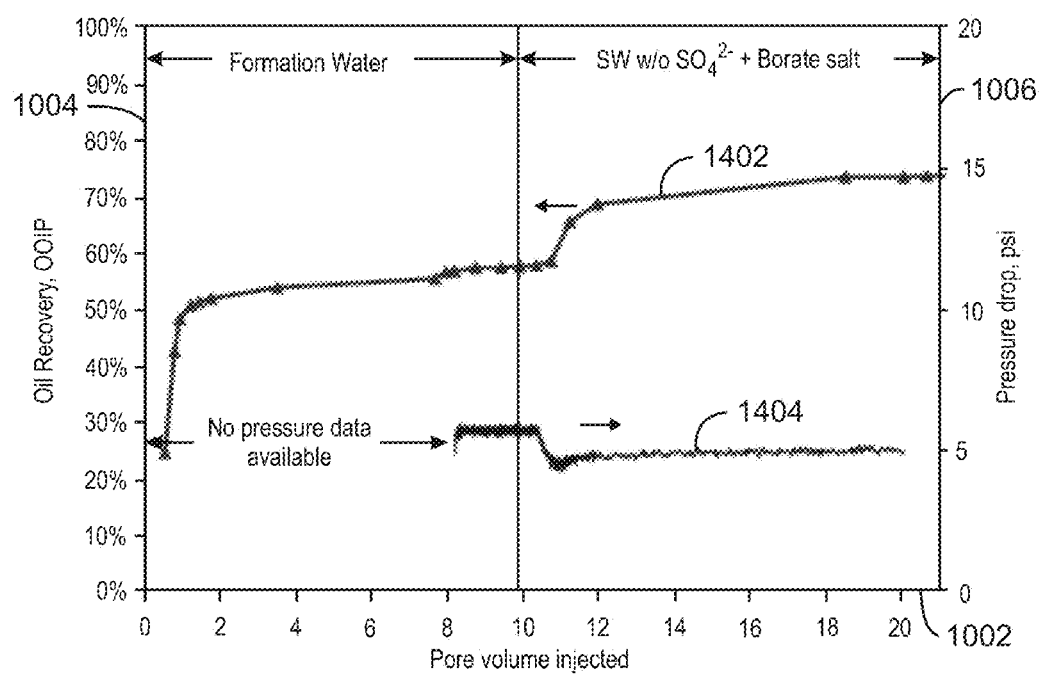
FIG. 14 is a plot of incremental oil recovery and pressure drop for limestone core L2 using a borate waterflood.

FIG. 14 is a plot 1400 of incremental oil recovery 1402 and pressure drop 1404 for limestone core L2 using a borate waterflood. The axes 1002, 1004, and 1006 are as defined above (FIG. 10). Formation water recovered 57.7% OOIP before oil production ceased. Formation water was injected for about 10 pore volumes. The pressure drop data for the initial part of this coreflood was not available. Modified brine containing borate ions was flooded through core L2 after formation water. The modified borate brine contained 22.5 g borax ($Na_2B_4O_7.10H_2O$) in 1 kg solution of SW w/o $SO_4^{2-}$.

For comparison and consistency with the previous corefloods, sea water was used as the base for modified brine preparation. However, sulfate ion was selectively removed from the sea water to separate its contribution to any enhanced oil recovery. Incremental oil recovery 1402 of 15.6% OOIP was measured with SW w/o $SO_4^{2-}$ containing borate salt. Most of this enhanced recovery occurred in the injection interval of about one pore volume as shown in FIG. 6. Enhanced oil recovery was significantly higher for the modified brine containing borate ion than for the modified brine containing sulfate ion. Similar to previous corefloods, pressure 1404 across core L2 dropped while switching between injection brines, which may be attributed to the same reasons, an increase in water saturation due to additional oil recovery, and lower modified brine viscosity.

Figure 15:
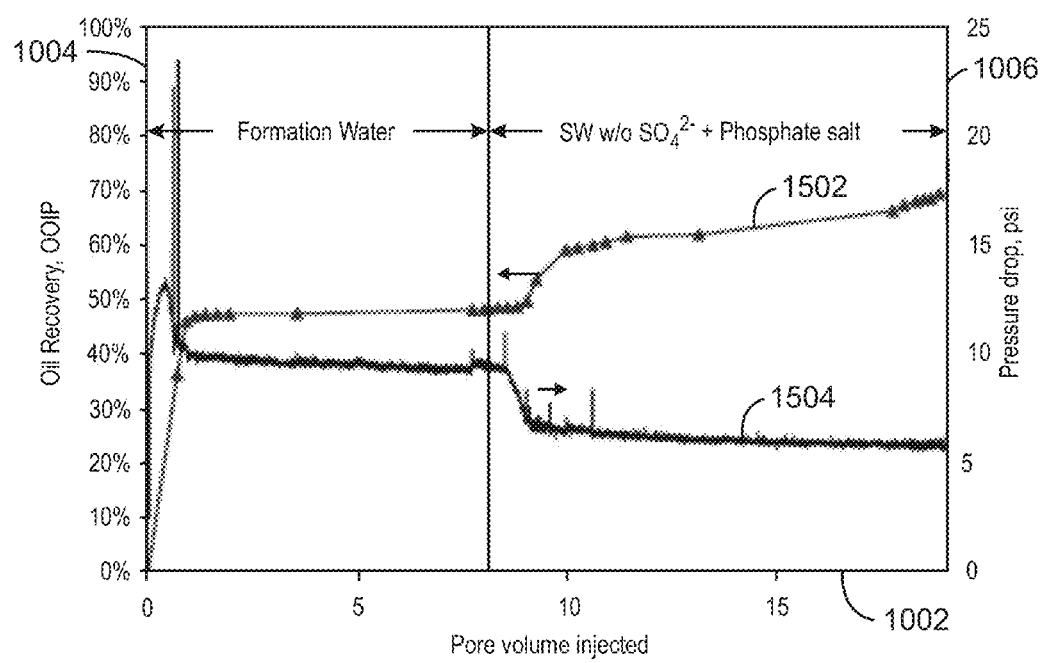
FIG. 15 is a plot of incremental oil recovery and pressure drop for limestone core L3 using a phosphate waterflood.

FIG. 15 is a plot 1500 of incremental oil recovery 1502 and pressure drop 1504 for limestone core L3 using a phosphate waterflood. The axes 1002, 1004, and 1006 are as defined above (FIG. 10). Similar to the coreflood on core L2, the modified brine concentration of 10 g trisodium phosphate in 1 kg solution of SW w/o SO42- was prepared by adding a salt containing phosphate into SW w/o $SO_4^{2-}$. Formation water recovered 48.3% OOIP in about eight pore volumes and was followed by the modified brine. An additional 21.3% OOIP was recovered with SW w/o $SO_4^{2-}$ containing phosphate salt. Enhanced oil recovery occurred with sharp pressure drop across core L3 with most of the enhanced oil recovery occurring in about one pore volume interval of modified brine injection. Coreflood experiments performed on Middle Eastern limestone for salt screening are summarized in Table 6. For the AIM experiments performed on Middle Eastern limestone, modified brines containing phosphate and borate salts were more effective than with sulfate salt.

In all plots, a noticeable delay in the pressure drop profile appears after switching from formation to modified brine. This delay occurred because of the volume required to replace the relatively large dead volume from the pump to the core inlet in the test apparatus 900 (FIG. 9), as compared to core pore volume. A similar delay was observed for oil recovery, which occurred due to the dead volumes present both upstream and downstream of the core. The upstream dead volume was larger than the downstream dead volume. The modified brines discussed above have consisted of sea water and various added salts. To evaluate the impact of just sea water on oil recovery, coreflood experiments were performed using SW w/o $SO_4^{2-}$ as the modified brine, as discussed with respect to FIG. 16. Sea water has lower salinity and is a softer brine compare to formation water.

Figure 16:
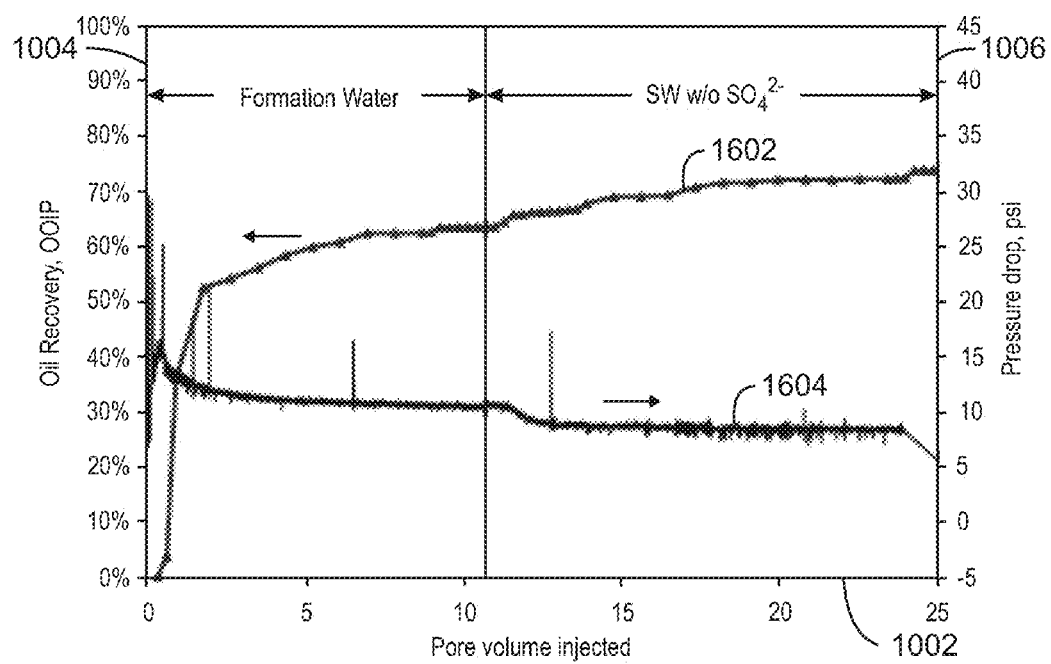
FIG. 16 is a plot of incremental oil recovery and pressure drop for core limestone L4 using seawater without added ions as the waterflood material.

FIG. 16 is a plot 1600 of incremental oil recovery 1602 and pressure drop 1604 for core limestone L4 using seawater without added ions as the waterflood material. The axes 1002, 1004, and 1006 are as defined above (FIG. 10). Formation water recovered 64.4% OOIP in about 11 pore volumes. SW w/o $SO_4^{2-}$ containing no additional salt alone recovered an additional 9% OOIP.

TABLE 6

| Core ID | Temperature (° F.) | Pressure Pore/Sleeve (psi) | Orientation (Horizontal/Vertical) | Formation Water Recovery (OOIP) | Modified brine | AIM Recovery (OOIP) |
|---|---|---|---|---|---|---|
| L1 | 250 | 4000/5000 | Vertical | 55.8% | Sea Water 4× $SO_4^{2-}$ (with extra MgCl2) | 5.1% |
| L2 | 250 | 4000/5000 | Vertical | 57.7% | SW w/o $SO_4^{2-}$ + Borate | 15.6% |
| L3 | 250 | 4000/5000 | Vertical | 48.3% | SW w/o $SO_4^{2-}$ + Phosphate | 21.3% |

Figure 17:
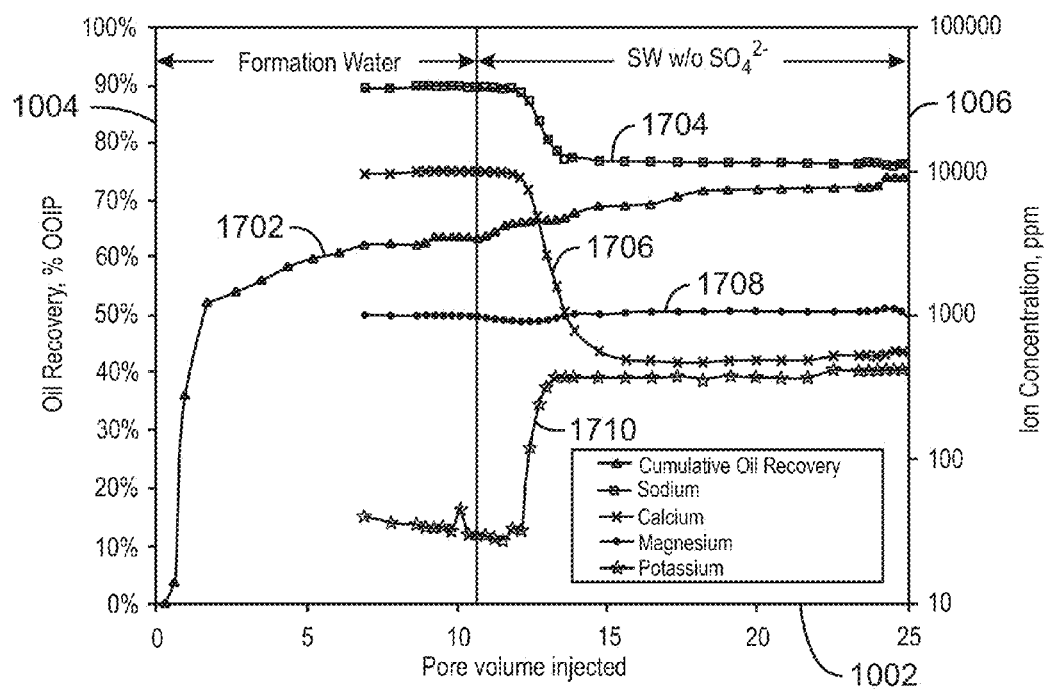
FIG. 17 is a plot of oil recovery and ion chromatography results for limestone core L4 using seawater as the waterflood material.

FIG. 17 is a plot 1700 of oil recovery 1702 and ion chromatography results 1704-1710 for limestone core L4 using seawater as the waterflood material. The x-axis 1002 and the left y-axis 1004 are as defined above (FIG. 10). The right y-axis 1703 represents the ion concentration of sodium 1704, calcium 1706, magnesium 1708, and potassium 1710, as determined by an ion chromatograph. The concentration of each of the ions changed sharply with switching between brines, unlike the oil recovery 1702 which was sluggish, with oil trickling out of the core for many pore volumes. Stabilized values were close to the ion concentration in sea water. The concentrations of ions of magnesium 1708, potassium 1710, and sodium 1704 stabilized in less pore volumes compared to the concentration of calcium 1706 during brine switching. The calcium ion was the most sluggish and took about two pore volume to stabilize. This can be attributed to strong calcium contrast of 16 to one between formation water and sea water. Any small mixing between the two brines can reflect strongly on calcium concentration profile. The possibility of rock dissolution in small quantity cannot be ruled out as well.

A coreflood experiment was designed to compare the effectiveness of sea water alone versus sea water containing a salt in enhancing oil recovery from the studied Middle Eastern rock-oil system. Phosphate was selected as the salt added to sea water to prepare the modified brine in this experiment. This experiment was also designed to determine the effective concentration range required to observe significant enhanced oil recovery with phosphate. The experiment was performed on core L5, as discussed with respect to FIG. 18.

Figure 18:
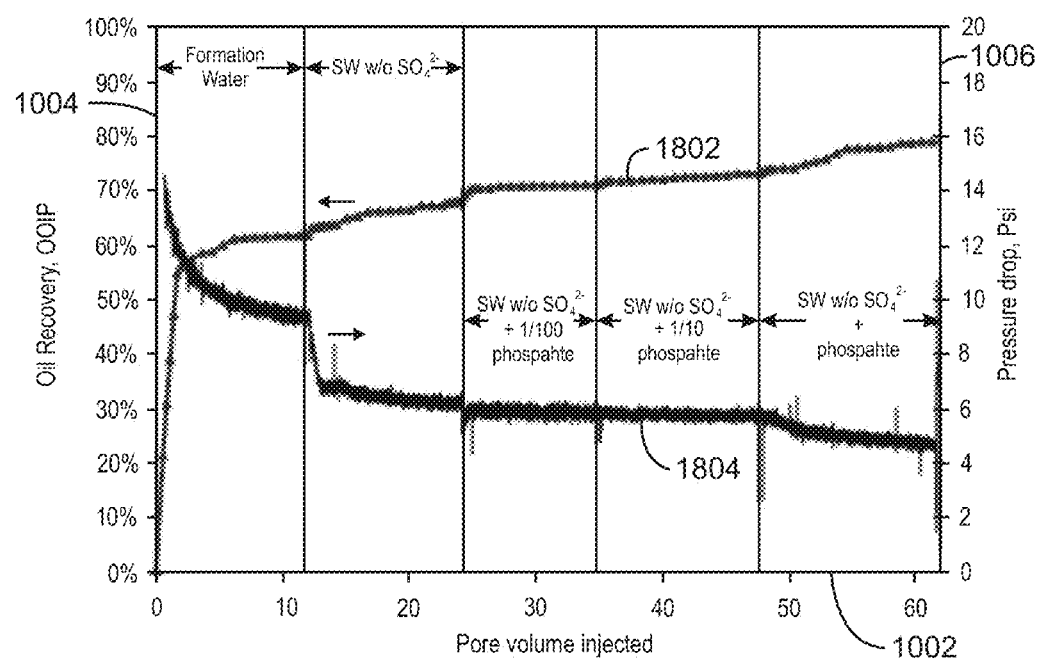
FIG. 18 is a plot of incremental oil recovery and pressure drop for limestone core L5 using phosphate ions in the waterflooding.

FIG. 18 is a plot 1800 of incremental oil recovery 1802 and pressure drop 1804 for limestone core L5 using phosphate ions in the waterflood. The axes 1002, 1004, and 1006 are as defined above (FIG. 10). The core was first flooded with formation water followed by SW w/o $SO_4^{2-}$. This was then followed by three brines containing an increasing concentration of phosphate ion dissolved in SW w/o $SO_4^{2-}$. The brine containing the highest concentration of phosphate, 10 g of trisodium phosphate in 1 kg solution of SW w/o $SO_4^{2-}$, was the same as the concentration of the modified brine used with core L3 (FIG. 15). The other two brines contained 1/100 and 1/10 of the highest concentration phosphate brine in SW w/o $SO_4^{2-}$, i.e., 1 g of trisodium phosphate in 1 kg solution of SW w/o $SO_4^{2-}$, and 0.1 g of trisodium phosphate in 1 kg solution of SW w/o $SO_4^{2-}$, respectively. An additional 7.1% OOIP was recovered with SW w/o $SO_4^{2-}$ after the formation waterflood, which itself produced a recovery of 63.2% OOIP in about 11 pore volumes before oil production ceased. This recovery includes the oil that was recovered just after switching between SW w/o $SO_4^{2-}$ and SW w/o $SO_4^{2-}$ containing 1/100 times base phosphate ion concentration. This oil was trapped during SW w/o $SO_4^{2-}$ flood in the BPR at the core outlet and was dislodged early during the coreflood with 1/100 times phosphate. Similarly, the small jump in oil recovery after formation waterflood was discounted from SW w/o $SO_4^{2-}$ recovery. Accordingly, this indicates that sea water alone may improve waterflood efficiency compared to formation water in Middle Eastern environment.

Brines containing 1/100 and 1/10 times base phosphate ion concentration in SW w/o $SO_4^{2-}$ produced minimal oil resulting in a negligible change in pressure drop 1804. However, an increase in oil recovery was observed with the highest concentration phosphate brine, suggesting that a threshold phosphate ion concentration greater than about 1 g of trisodium phosphate in 1 kg solution of SW w/o $SO_4^{2-}$ (e.g, greater than about 1,000 ppm or 0.006 M) and less than about 10 g of trisodium phosphate in 1 kg solution of SW w/o $SO_4^{2-}$ (e.g, less than about 10,000 ppm or 0.061 M) may be required. A corresponding decrease in pressure drop was also noted. However, the slope of the oil recovery curve with base phosphate brine in this core is not as sharp as with core L3 (FIG. 15). Previous oil recovery by SW w/o $SO_4^{2-}$ and a corresponding reduction in oil relative permeability can explain this sluggish oil recovery behavior. Overall, a combined increment of 15.7% OOIP was observed with all modified brines.

Clearly, adding a selective salt to sea water may have a greater impact on the oil recovery than sea water alone. In core L4, sea water containing phosphate may further enhance oil recovery after sea water injection. Also, for this fluid/rock system, the oil recovery profile was sharper when a salt is added to SW w/o $SO_4^{2-}$ (core L2, L3 and L4) compared to just SW w/o $SO_4^{2-}$. SW w/o $SO_4^{2-}$ alone could recover an additional 7-9% OOIP recovery in our system using small core plugs. A similar range of oil recovery on carbonates with brines of similar or lower salinity than SW w/o $SO_4^{2-}$ (29970 ppm) has been reported in literature. In experiments with carbonate composite coreflood at 212° F., Yousef, A. A., Al-Saleh, S, Al-Kaabi, A., and Al-Jawfi, M.: "Laboratory Investigation of Novel Oil Recovery Method for Carbonate Reservoirs," SPE 137634, presented at Canadian Unconventional Resources and International Petroleum Conference, Calgary, Canada, 19-21 Oct., 2010, observed additional 7-8.5% OOIP recovery with 28800 ppm brine, which was injected after coreflooding with twice concentrated, 57600 ppm brine. Field connate water had a salinity of 213734 ppm. See Alotaibi, M. B., Nasralla, R. A., and Nasr-El-Din, H. A.: "Wettability Challenges in Carbonate Reservoirs," SPE 129972, presented at SPE Improved Oil Recovery Symposium, Tulsa, Okla., 24-28 Apr. 2010, reported additional 8.6% oil recovery with an aquifer brine (5436 ppm) after formation waterflood (230000 ppm). While these earlier reports illustrated potential enhanced oil recovery using waterflood compositions of lower salinity, none of these reports disclose or suggest using a waterflood composite at the same total dissolved solids, or suggest adding a salt, like borate or phosphate.

Two prominent differences between sea water and formation water are the total salinity and brine hardness. To potentially identify the cause of sea water effectiveness in improving waterflood recovery, an experiment was designed to investigate the impact of brine hardness and total salinity on oil recovery from Middle Eastern limestone. The experiment was performed on core L6, which was flooded with four brines: formation water, formation water without magnesium and calcium (FW without Mg and Ca), formation water without magnesium (FW without Ca), and SW w/o $SO_4^{2-}$. Total salinity of the first three brines was similar and close to 182000 ppm. The results are discussed with respect to FIG. 19.

Figure 19:
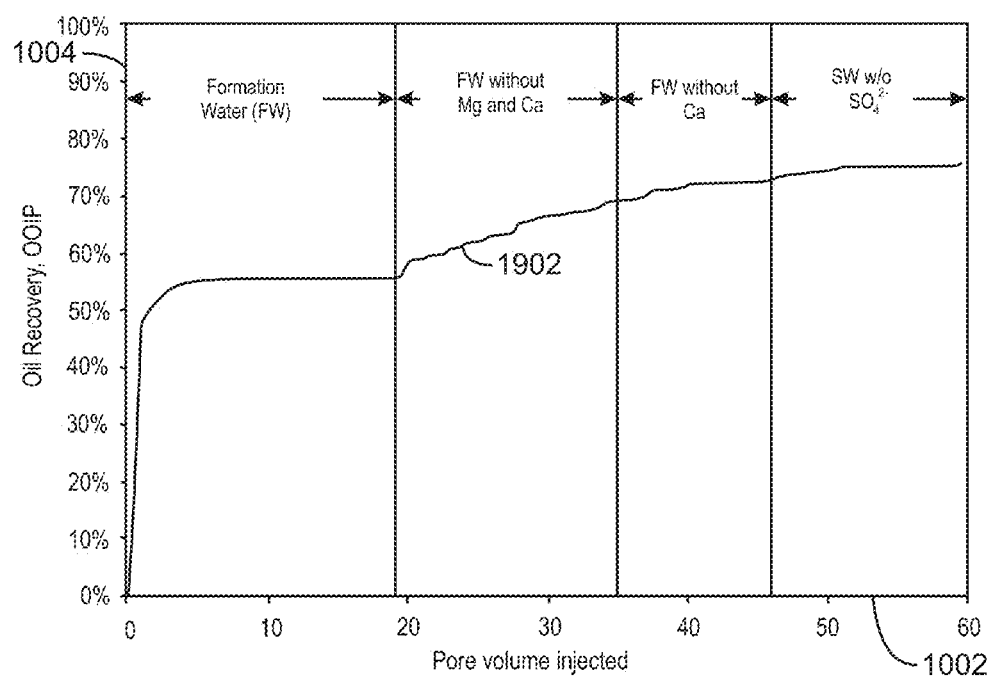
FIG. 19 is a plot of incremental oil recovery for limestone core L6.

FIG. 19 is a plot 1900 of incremental oil recovery 1902 for limestone core L6. The axes 1002 and 1004 are as defined above (FIG. 10). The formation water alone recovered 57.7% OOIP in about 19 pore volumes, which was followed by the soft formation brine, which is formation brine with both magnesium and calcium ions selectively removed (FW without Mg and Ca). An increment of 11.4% OOIP was recovered with FW without Mg and Ca. Thus, a comparable improvement in oil recovery to sea water was obtained with a higher salinity brine but with reduced hardness. An additional 3.9% OOIP was obtained with FW without Ca, although the oil profile looks like a continuation of the oil trickling from the previous brine. Less than 2% OOIP was recovered with sea water without sulfate, which was the last injected brine in core L6. In this experiment, lower salinity brine (SW w/o $SO_4^{2-}$) could not further improve oil recovery. Thus, the effectiveness of sea water in previous experiments may have been driven primarily by lower divalent cation concentration (in the seawater compared to the formation water) rather than total salinity. However, for this oil-rock system, the oil recovery profile for both sea water and soft formation water was not sharp and oil continued to trickle out for many pore volumes. Clearly, the addition of borate and phosphate salt in sea water were more effective in enhancing oil recovery, and most of the oil was recovered in about one pore volume interval of modified brine injection. The experimental results involving soft brines (cores L4, L5, and L6) are summarized in Table 7.

TABLE 7

| Core ID | Temperature (° F.) | Pressure Pore/Sleeve (psi) | Orientation (Horizontal/vertical) | Formation Water Recovery (OOIP) | Modified Brines | AIM recovery (OOIP) |
|---|---|---|---|---|---|---|
| L4 | 250 | 4000/5000 | Vertical | 64.4% | SW w/o $SO_4^{2-}$ | 9.0% |
| L5 | 250 | 4000/5000 | Vertical | 63.2% | SW w/o $SO_4^{2-}$, Multiple Dilutions of Phosphate | 7.1% (SW w/o $SO_4^{2-}$), 15.7% Overall |
| L6 | 250 | 4000/5000 | Vertical | 57.7% | FW without Ca and Mg, FW without Ca, SW w/o $SO_4^{2}$ | 11.4%, 3.9%, 1.8% |

Figure 20:
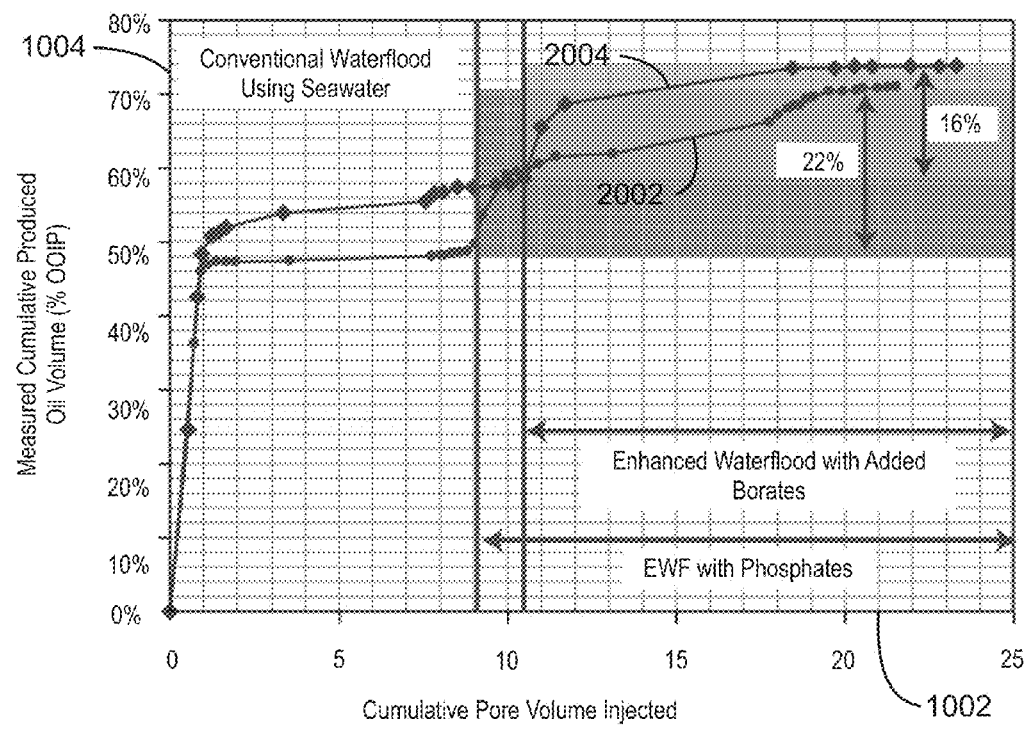
FIG. 20 is a plot showing further examples of oil recovery from a phosphate modified waterflood and a borate modified waterflood.

FIG. 20 is a plot 2000 showing further examples of oil recovery from a phosphate modified waterflood 2002 and a borate modified waterflood 2004. The axes 1002 and 1004 are as defined above (FIG. 10). The core was flooded for eight pore volumes using formation water to get an accurate assessment of recovery under a conventional waterflood. Consistent with typical laboratory core floods, the overall recovery for the formation waterflood was around fifty percent. The waterflood was then switched to a modified injection brine where the inorganic salt trisodium phosphate at a concentration of about 10,000 ppm (1 wt percent) was added to synthetic sea water. Overall oil recovery 2002 using the modified injection brine increased from around fifty percent up to seventy percent, resulting in an increase of over twenty percent incremental recovery.

Also illustrated in the plot 2000 are results from a modified waterflood using borate 2004. This test was conducted on a core with similar properties as the previous test. In preparation, the limestone core was restored to an oil-wet condition using the aging process described herein. During the initial water flood, overall oil recovery 2002 was around fifty seven percent after approximately ten pore volumes of connate water. Following the initial waterflood, a modified brine including about 22,500 ppm (2.25 wt percent) borax decahydrate was injected. During injection of the modified brine, oil recovery 2004 increased from around fifty seven percent up to around seventy five percent, resulting in an increase in incremental oil recovery of about sixteen percent.

Figure 21:
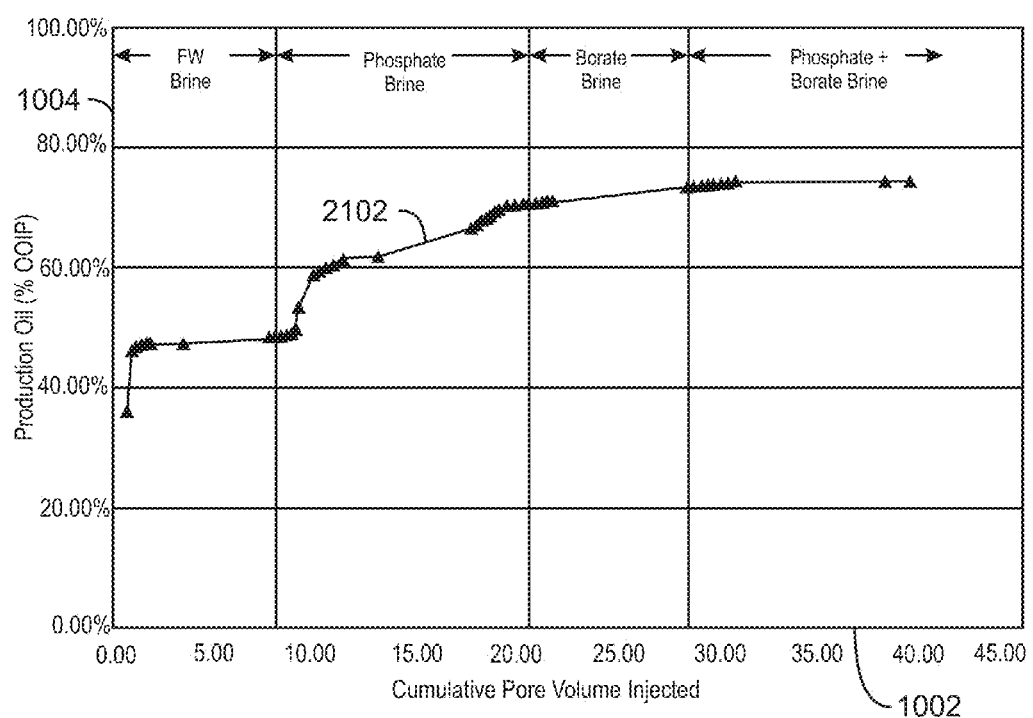
FIG. 21 is a plot showing incremental oil recovery due to addition of inorganic salts to the injection brine.

FIG. 21 is a plot 2100 showing incremental oil recovery 2102 due to addition of inorganic salts to the injection brine. The axes 1002 and 1004 are as defined above (FIG. 10). In the plot, a formation brine injection was followed by an injection of a modified phosphate brine, using the concentrations discussed with respect to FIG. 20, e.g., 10 g trisodium phosphate in 1 kg solution of SW w/o $SO_4^{2-}$. This was followed sequentially by a modified borate brine of the same concentration as in FIG. 20, without further conditioning of the core between solutions. By injecting the borate brine sequentially following the phosphate brine, an additional uplift in incremental oil recovery of around five percent was obtained. This was followed by a modified brine consisting of both borate and phosphate. The combined brine included about 10,000 ppm trisodium phosphate and about 22,000 ppm borax decahydrate, which were added to a synthetic sea water. The final step of the flood resulted in an additional couple of percent increase in incremental oil recovery. The results from the third and fourth steps of FIG. 21 indicate that by sequentially changing ions, and combining different salts, synergies can be obtained where the total oil recovery is higher than would be obtained for either brine alone.

Figure 22:
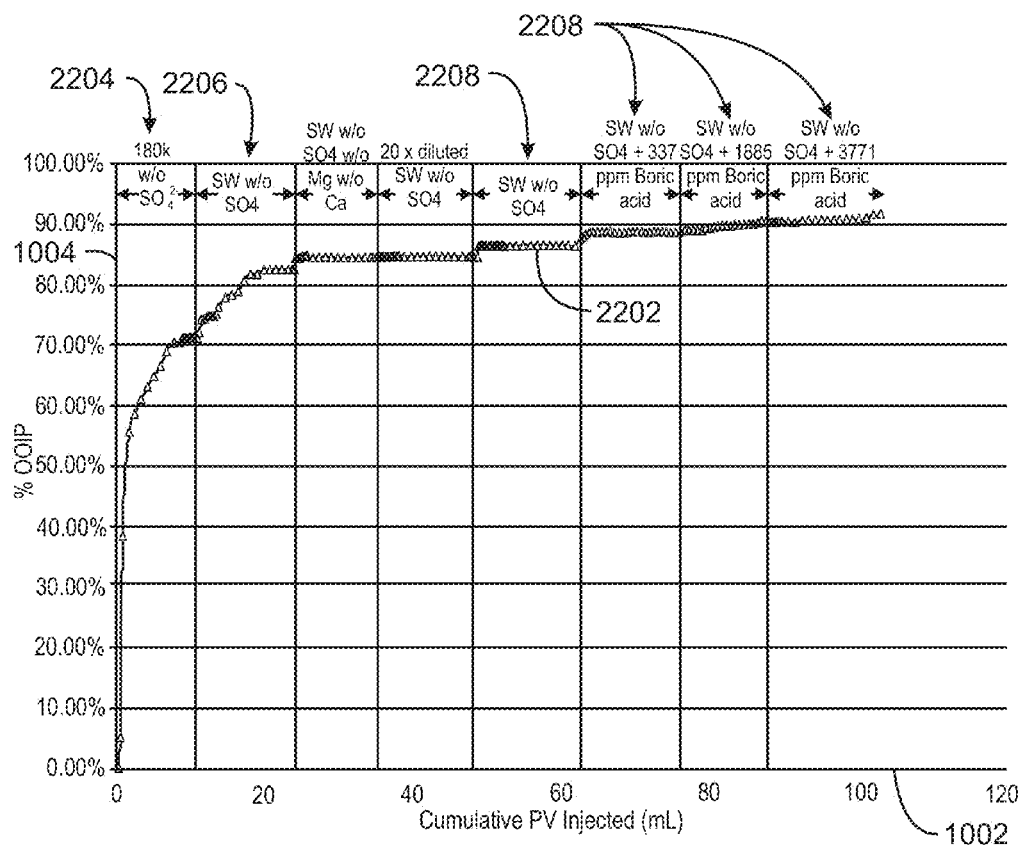
FIG. 22 is a plot showing incremental oil production after a drop in the total dissolved solids (TDS) of the flood water from 180,000 ppm (parts per million on a mass basis) to sea water condition (SW w/o sulfate)

FIG. 22 is a plot 2200 showing incremental oil production 2202 after a drop in the total dissolved solids (TDS) of the flood water from about 180,000 ppm 2204 to sea water condition (SW w/o sulfate) 2206. The axes 1002 and 1004 are as defined above (FIG. 10). In a core flood of a 1.5 inch diameter 2 inch carbonate core plug, the initial injection water, which was a formation water 2204, had a total dissolved solids concentration of about 180,000 ppm (Formation Water, Table 4). The initial waterflood was then followed by a lower salinity flood of about 30,000 ppm synthetic sea water 2206 (Sea Water without sulfate, Table 4) which resulted in an increase in OOIP recovered of 12%. Further sequential ion changes 2208 continued to show improvements to recovery 2202, resulting in a final recovery of over 90%.

Figure 23:
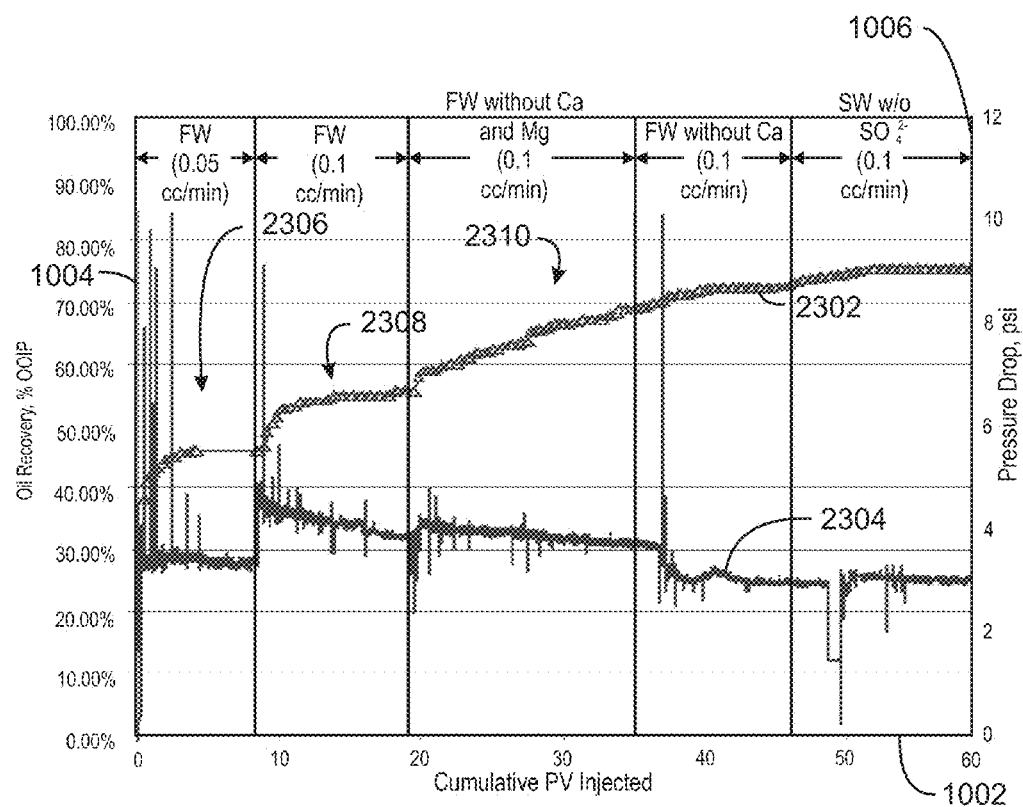
FIG. 23 is a plot showing incremental oil recovery and pressure drop after replacement of at least a portion of the divalent ions in the formation brine with monovalent ions.

FIG. 23 is a plot 2300 showing incremental oil recovery 2302 and pressure drop 2304 after replacement of at least a portion of the divalent ions in the formation brine with monovalent ions. The axes 1002, 1004, and 1006 are as defined above (FIG. 10). In a core flood of a 1.5 inch diameter by 2 inch long carbonate core plug, the initial injection water (formation water) had a total dissolved solids concentration of 180,000 ppm (Formation Water, Table 4). During the initial waterflood, two different flow rates were tested and account for the first two plateaus 2306 and 2308. Following the second plateau 2308, the injection water was replaced with a softened formation water 2310 which has a composition similar to the original formation water, but with the calcium and magnesium removed (FW without Ca and Mg, Table 4). The change in injection water from formation water (55% OOIP recovered) to softened formation water (70% OOIP recovered), resulted in an incremental recovery of 15% OOIP.

Figure 24:
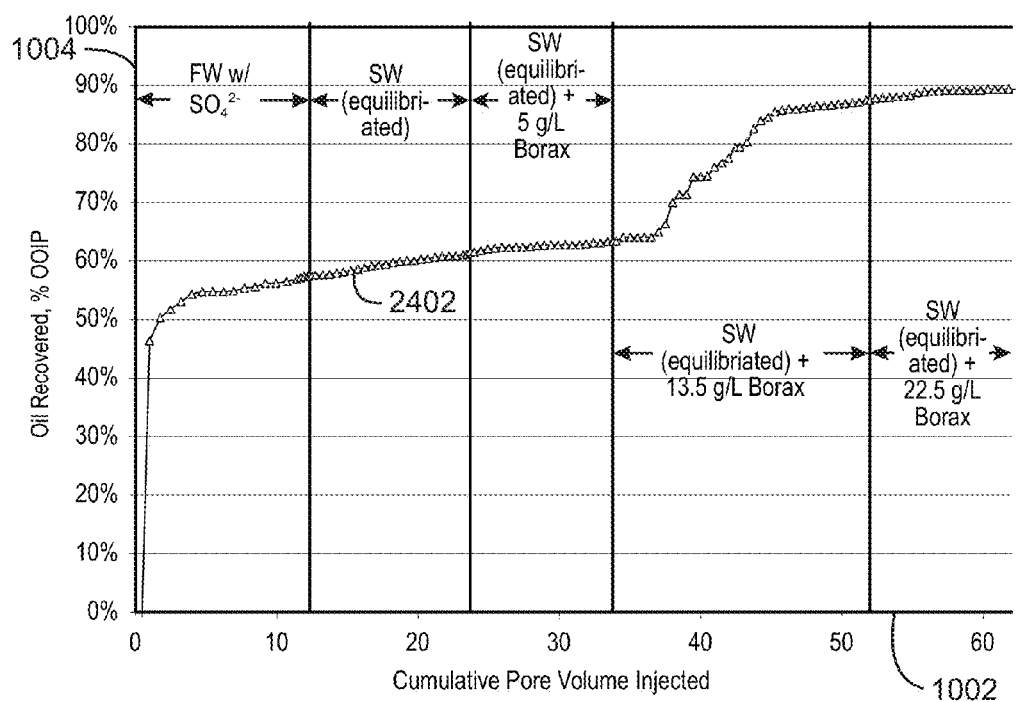
FIG. 24 is a plot of incremental oil recovery using borate ions in the waterflood.

FIG. 24 is a plot 2400 of incremental oil recovery 2402 using borate ions in the waterflood. The axes 1002 and 1004 are as defined above (FIG. 10). The core was first flooded with FW w/ $SO_4^{2-}$ followed by equilibrated SW (here, equilibrated SW refers to a synthetic SW that was equilibrated with limestone by passing the brine through a limestone core (not containing oil) in sequential steps, where at each step the ion concentration of the brine was measured; the brine was repeatedly passed through the limestone core until the measured ion concentrations reached a stable value, indicating the brine had reached equilibrium with the limestone core. The equilibration step was included to minimize the potential of dissolution during the waterflood and hence separate the potential effects of dissolution from the effect of adding the inorganic salts). This was then followed by three brines containing an increasing concentration of borate ion dissolved in equilibrated SW. The brine containing the highest concentration of borate, 22.5 g borax ($Na_2B_4O_7 \cdot 10H_2O$) in 1 kg solution of equilibrated SW (about 0.059 M) was the same as the concentration of the modified brine used in FIG. 14. The other two brines contained 5 g borax ($Na_2B_4O_7 \cdot 10H_2O$) in 1 kg solution of equilibrated SW (about 0.013 M), and 13.5 g borax ($Na_2B_4O_7 \cdot 10H_2O$) in 1 kg solution of equilibrated SW (about 0.035 M).

The brine containing 5 g borax in 1 kg solution produced minimal additional oil recovery 2402, whereas the brine containing 13.5 g borax in 1 kg solution resulted in an additional 23% OOIP recovered 2402, suggesting that a threshold borate ion concentration greater than about 5 g of borax in 1 kg solution (e.g, greater than about 5,000 ppm or 0.013 M) and less than about 13.5 g of borax in 1 kg solution (e.g, less than about 13,500 ppm or 0.035 M) may be required.

Figure 25:
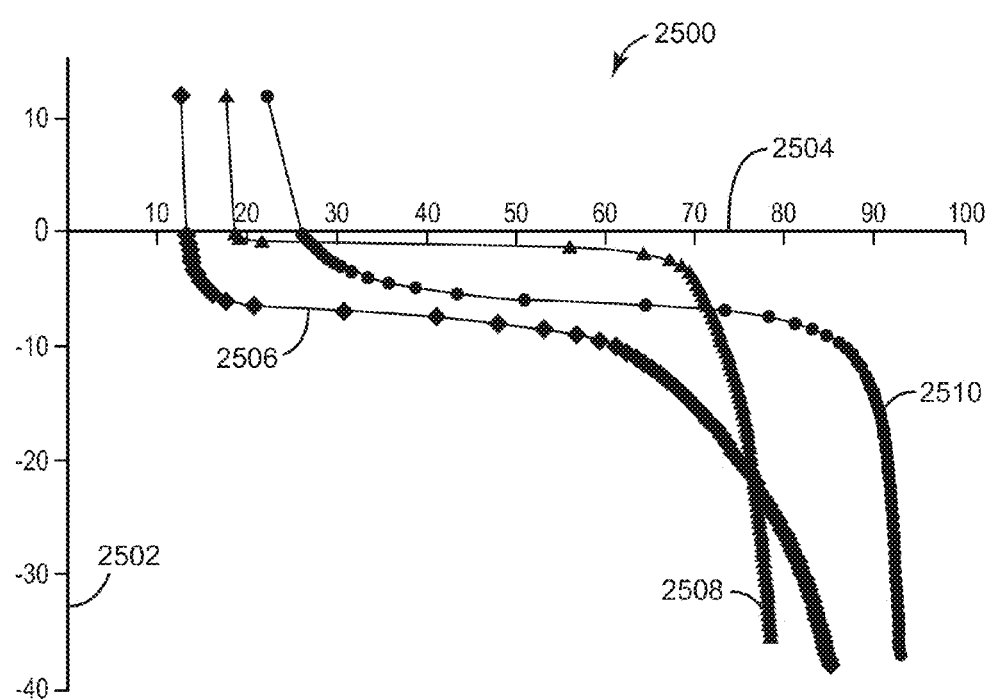
FIG. 25 is a plot of the imbibition capillary pressure (Pc) as a function of formation water saturation.

FIG. 25 is a plot 2500 showing the imbibition capillary pressure (Pc) 2502 on the y-axis as a function of formation water saturation (Sw) 2504 on the x-axis, for three Middle Eastern limestone plugs: 2506, 2508 and 2510. For this test, all three plugs were initially centrifuged to residual oil saturation using formation brine (Formation Water, Table 4). The centrifuge test was performed at 150° F., and the revolution speed was increased in steps up to 3200 rpm. After centrifuging, the plugs were separately flooded with borate brine (seawater w/o sulfate+22.5 g/L of Borax) at 250° F. and 500 psi. Table 8 shows the plug properties and oil production data after centrifuge and coreflood tests.

TABLE 8

Centrifuge and coreflood results on plugs 2506, 2508 and 2510

| | Plug | | |
|---|---|---|---|
| | 2506 | 2508 | 2510 |
| Centrifuge Brine | Formation Water | Formation Water | Formation Water |
| Oil | Oil A | Oil A | Oil B |
| Permeability (mD) | 4.200 | 5.7 | 5.7 |
| Initial water saturation (%) | 12.9 | 22.3 | 17.6 |
| Initial oil (cc) | 12.568 | 12.768 | 8.297 |
| Oil produced during centrifuge (cc) | 7.00 | 9.00 | 5.50 |
| Oil produced during centrifuge (% OOIP) | 55.7% | 70.5% | 66.3% |
| Oil produced during borate brine flush | 0.91 | 1.05 | 0.06 |
| Additional oil recovered with borate brine (% OOIP) | 7.2% | 8.2% | 0.7% |

For plugs 2506 and 2508, an additional 7-8% OOIP was obtained using the borate brine, suggesting that the modified brine was able to liberate additional oil beyond the levels obtained using formation water. For plug 2510, less than 1% additional oil was recovered using the modified borate brine. This agrees with expectations because in previous corefloods with rock and oil systems similar to plug 2510, minimal additional oil was recovered. The oil B used in plug 2510, had a lower total acid number than oil A. The capillary pressure curves in FIG. 25 indicate that plug 2510 is relatively more water-wet compared to plugs 2506 and 2508 and is a potential reason plug 2510 did not show significant incremental oil recovery.

In an additional test using a rock and oil system similar to plug 2506, both centrifuge and coreflood tests were performed with the borate brine. As expected, minimal oil was recovered during the coreflood test. These results suggest that for plugs which have already been exposed to borate brine, re-flooding with borate brine only provides minimal additional uplift. Conversely, for cores that have only been exposed to formation water, additional oil can be recovered by using an AIM brine, borate in this case.

Overall, these test results suggest that the modified borate brine is able to reduce residual oil saturation beyond the levels achieved using formation water, and hence, achieve higher oil recoveries.

Summary of Results

In the work described with respect to FIGS. 10-24, experiments were performed on single plugs to perform quick screening of various modified brines and to develop an understanding of the AIM technology. The error margins are higher than a composite coreflood experiment due to smaller fluid volumes and a larger capillary end effect. The experiments are intended to give a recovery range and compare different modified brines performance. Accuracy of these experiments can be improved by performing them on a larger composite (5-7 plugs in series). For a better representation of reservoir conditions, experiments need to be performed using live oil.

In all experiments, formation water was injected first until oil production ceased. The target oil left for the modified brine was the "difficult" oil which was discontinuous and/or in the form of thin film. In a field application, a smaller pore volume of formation water may be injected, and chances for improving recovery and forming an oil bank are high. Reservoir heterogeneity may impact sweep efficiency, which would impact oil recovery in a field-scale application, and may reduce overall recovery factor.

For corefloods discussed in this disclosure, the key mechanism for improved oil recovery is believed to be wettability alteration towards a water-wet condition. While the alteration to a water-wet condition may be the key mechanism, the experiments described herein reveal several manners in which this change to water-wet may be effected.

Rock dissolution may be the dominating mechanism for improved recovery with sea water (core L4 and L5) and soft formation water (core L6). Both brines were soft compared to formation water, which was in chemical equilibration with the rock before modified brine injection. Upon injection of soft brine, rock dissolution may occur causing some oil to desorb and alter wettability towards water-wet state. Small rock dissolution could be sufficient in limestone to observe desired wettability alteration with soft brines.

Compared to just soft injection brine, adding a salt to sea water clearly improved modified brine performance (cores L1, L2, L3 and L5) with most of the oil recovered with one pore volume injection. The evidence is demonstrated at least in coreflood L5 where phosphate ion added to sea water was able to further enhance oil recovery after sea water injection. Clearly, adding salt seems to further impact the rock-fluid interaction. Modified brine containing a selective salt added to sea water may recover additional oil by both rock dissolution and surface ion exchange. Brine softness may trigger rock dissolution, while presence of salt like phosphate, borate, and sulfate may induce surface ion exchange. The relative contribution of these two mechanisms may depend on brine composition and the type of salt added.

The process of adding a salt to sea water to enhance oil recovery as discussed herein is not an alkaline flooding. In an alkaline waterflood, the pH of the injection water is increased by adding a strong alkali to the injection water. Further, an acidic crude reacts with the alkaline water and oil to generate, in-situ, enough surfactant to reduce oil-water interfacial tension (IFT) to low values (10-2-10-4 dynes/cm). This IFT reduction increases the capillary number (viscous to capillary forces) required to lower residual oil saturation.

In contrast, the acid number of the oil described herein was low (0.11 mg KOH/g) and unfavorable for an effective alkaline flooding. Table 9 shows IFT and pH for different oil-brine system.

TABLE 9

IFT and pH for different oil-brine system

| Brine | IFT (dynes/cm) | pH at 200° F. |
|---|---|---|
| Formation Water | 21 | 6 |
| Sea Water | 25 | 6.7 |
| Phosphate salt in sea water | 12 | 8.8 |
| Borax salt in sea water | — | 7.4 |
| NaOH salt in sea water | 1.6 | 11 |

IFT was measured at 4000 psi and 250° F., whereas pH was measured at 200° F. and atmospheric pressure. Clearly, IFT between the oil and brines were high for an alkaline flooding. The IFT for the best performing modified brine, sea water containing phosphate salt, measured 12 dynes/cm; while a strong alkali like sodium hydroxide could only reduce IFT to 1.6 dynes/cm even though brine pH at 200° F. was 11, sufficiently high for an alkaline flooding. Even for an acidic crude oil, the pH values (as shown in Table 9) for the modified brines used in this work were too low side for effective alkaline flooding, and were found to further decrease with increases in temperature. Thus, the systems and methods of the AIM technology are different than used for alkali flooding. While the AIM technology utilizes different fundamental mechanisms and utilizes different compositions and procedures, there remains a possibility that some in-situ surfactant generation and its interaction with rock and oil in the presence of inorganic salt may contribute to altering wettability, but its contribution is minimal compared to other factors.

In previous studies, the extent of wettability alteration was found to increase with temperature. In those studies, a temperature above 212° F. was found to be important to observe oil recovery. To recover additional oil with a modified brine during spontaneous imbibition, a large shift in wettability towards water-wet state is needed such that existing positive capillary pressure changes to a negative, or a sufficiently low value where gravity force becomes dominating.

For viscous flooding, a change in capillary pressure is not required for a modified brine to be effective. A small shift in wettability towards water-wet state may be sufficient to improve oil recovery. Therefore, the AIM technology described herein can be effective for non-fractured carbonates even at lower temperatures (<212° F.). Significant oil was recovered at 158° F. (70° C.) during coreflood experiments on core D1 and D2.

Overall, the AIM technologies described herein may provide a low-cost enhanced oil recovery (EOR) method that can be easy to implement. All salts used in this work are commercially available and are much cheaper than surfactants. Unlike a surfactant flood, which may have co-surfactant, alkali, polymer, alcohol or combination added to the injection slug, AIM techniques may use just one salt that is added to a water source. Thus, the viscosity of the solutions are not used to enhance oil recovery and may be substantially the same, e.g., within an order of magnitude of each other. Further, the AIM technologies may be as simple as selectively removing ions to prepare the injection slug. Clearly, it may provide an inexpensive and potentially effective option for carbonate reservoirs.

While the foregoing discussion establishes the science and fundamental mechanics behind the concepts of the AIM technology described herein, the present disclosure further provides operational techniques adapted to facilitate the implementation of the AIM technology in the field. Examples of such operational techniques include operations planning tools and methods and operations procedures.

For example, to gain a better understanding of the processes that control enhanced recovery from the AIM core flood experiments, a series of core flood simulations were performed. The magnitude and timing of the incremental recovery and the associated pressure changes were accurately captured with the simulation, suggesting that the increased recovery was due to modification of the wettability induced by the changing ion composition. Using this process, the changes in wettability that can be expected under enhanced waterflood conditions can be bounded, and full field incremental recoveries can be more robustly predicted. Having shown the utility and ability of simulators to predict the recoveries based on the composition of the waterflood fluids, production engineers will be able to use simulators to optimize planned waterflood operations.

For example, the geochemistry of a particular formation segment may be analyzed through conventional techniques. The geochemistry may be input into an appropriate simulator together with data regarding a proposed waterflood composition and operation (e.g., pressure, rate, temperature, etc.). The simulator may then generate predicted recovery rates. Further, the above process of predicting a recovery for a particular waterflood operation may be repeated for multiple proposed waterflood operations to enable an operator to identify an optimal operation. Still further, a simulator may be adapted to iteratively simulate multiple potential waterflood compositions and operating conditions to identify an optimal waterflood operation based on operator selected priorities (e.g., operations cost, recovery rate, etc.).

As another example of operational enhancements that may be implemented based on the AIM technology, the injected fluids for the waterflood operation may be recovered and recycled. For example, the injection well(s) and production well(s) may be disposed such that the waterflood is produced together with the liberated hydrocarbons. Due to the nature of the ions being added to the waterflood composition in some implementations of the AIM technology, the ions (borates, phosphates, etc.) are substantially carried with the water rather than being lost to the formation. As the water is separated from the oil at the surface, the ions may be concentrated for reuse in waterflood compositions.

While the present techniques of the invention may be susceptible to various modifications and alternative forms, the exemplary systems, methods, implementations, and embodiments discussed above have been shown by way of example. However, it should again be understood that the invention is not intended to be limited to the particular embodiments disclosed herein. Indeed, the present techniques of the invention are to cover all modifications, equivalents, and alternatives falling within the spirit and scope of the invention as defined by the following appended claims.

What is claimed is:

1. A method for enhancing oil recovery from a subterranean formation, comprising:
    adding a first salt to a first aqueous stream to form a first injection stream with an increased concentration of a first ion;
    adding a second salt to a second aqueous stream to form a second injection stream with an increased concentration of a second ion, wherein the second injection stream is of substantially different composition than the first injection stream, and wherein the first injection stream and the second injection stream have substantially a same interfacial tension with a hydrocarbon and substantially a same kinematic viscosity;
    injecting the first injection stream into the subterranean formation at a first time;
    injecting the second injection stream into the subterranean formation at a second time, wherein the first injection stream and the second injection stream contact an overlapping portion of the subterranean formation; and
    recovering oil from the overlapping portion of the subterranean formation.

2. The method of claim 1, wherein adding at least one of the first salt and the second salt comprises:
    making a concentrated solution from a solid salt; and
    adding the concentrated solution to an aqueous stream.

3. The method of claim 1, wherein adding at least one of the first salt and the second salt comprises adding a solid salt to an aqueous stream.

4. The method of claim 1, wherein the kinematic viscosity of the second stream is within about 30% of the kinematic viscosity of the first injection stream at a common temperature and shear rate.

5. The method of claim 1, wherein the interfacial tension of the second injection stream with the hydrocarbon is within a factor of three of the interfacial tension of the first injection stream as measured at a same temperature.

6. The method of claim 1, further comprising adjusting a concentration of an ion to be greater than about 2,000 ppm different between the first injection stream and the second injection stream.

7. The method of claim 1, further comprising selecting a different salt for the first ion and the second ion.

8. The method of claim 1, further comprising injecting the first injection stream and the second injection stream into the subterranean formation via a single well completed within the subterranean formation.

9. The method of claim 1, further comprising injecting at least one of the first injection stream and the second injection stream into the subterranean formation via a well completed within a watered out zone of the subterranean formation.

10. The method of claim 1, further comprising splitting a formation water stream to form the first aqueous stream and the second aqueous stream.

11. The method of claim 1, further comprising forming an aqueous stream by reducing an ion concentration in another aqueous stream.

12. The method of claim 1, wherein at least one of the first salt and the second salt comprise at least one of borate, phosphate, silicate, nitrate, carbonate, citrate, acetate and sulfate.

13. The method of claim 12, wherein the phosphate is added in a concentration that is greater than about 1,000 ppm and less than about 10,000 ppm.

14. The method of claim 12, wherein the borate is added in a concentration that is greater than about 5,000 ppm and less than about 22,500 ppm.

15. The method of claim 12, wherein the borate is added in a concentration that is greater than about 5,000 ppm and less than about 13,500 ppm.

16. The method of claim 1, further comprising reducing a concentration of another ion in the first aqueous stream.

17. The method of claim 1, further comprising setting a pH of the first aqueous stream to at least 1 pH point difference from the second aqueous stream.

18. The method of claim 1, further comprising setting a concentration of the first ion in the first injection stream at least 1000 ppm higher than a concentration of a same ion in the second injection stream.

19. The method of claim 1, further comprising setting a concentration of the second ion in the second injection stream at least 1000 ppm higher than a concentration of a same ion in the first injection stream.

20. The method of claim 1, further comprising treating at least one of an aqueous stream and an injection stream to remove at least a portion of at least one of dissolved calcium ions and dissolved magnesium ions.

21. The method of claim 1, further comprising:
injecting the first injection stream through a first wellbore; and
injecting the second injection stream through a second wellbore.

22. The method of claim 1, further comprising adjusting a concentration of a selected ion to at least 1 gram of ion per kg of aqueous solution.

23. The method of claim 1, further comprising:
adding a third salt to a third aqueous stream to form a third injection stream;
injecting the third injection stream into the subterranean formation at a third time subsequent to the first time and the second time.

24. The method of claim 23, wherein the third salt is the same as the first salt.

25. The method of claim 23, wherein a composition of the first injection stream is the same as a composition of the third injection stream.

26. A system for enhancing oil recovery from a subterranean formation, comprising:
a first injection solution comprising a first salt added to a first aqueous stream;
a second injection solution comprising a second salt added to a second aqueous stream, wherein the first injection solution and the second injection solution have substantially a same interfacial tension with a hydrocarbon and substantially a same kinematic viscosity;
an injection well to the subterranean formation;
an injection system configured to inject the first injection solution and the second injection solution into the subterranean formation so that the first injection solution and the second injection solution contact a common portion of the subterranean formation;
a production well configured to produce fluids from the common portion of the subterranean formation; and
a separation system configured to separate the fluids into an aqueous stream and a hydrocarbon stream.

27. The system of claim 26, wherein the kinematic viscosity of the second injection solution is within about 30% of the kinematic viscosity of the first injection solution as measured at a common temperature and shear rate.

28. The system of claim 26, wherein the interfacial tension of the second injection solution is within a factor of three of the interfacial tension of the first injection solution as measured against a hydrocarbon at a same temperature.

29. The system of claim 26, wherein a concentration of an ion is at least 2,000 ppm different between the first injection solution and the second injection solution.

30. The system of claim 26, wherein the first salt comprises at least one of borate, phosphate, silicate, nitrate, carbonate, citrate, acetate and sulfate.

31. The system of claim 26, wherein the second salt comprises at least one of borate, phosphate, silicate, nitrate, carbonate, citrate, acetate and sulfate.

32. The system of claim 26, wherein the first salt and the second salt comprise a same ion and a concentration of the same ion in the second injection solution is higher than a concentration of the same ion in the first injection solution.

33. The system of claim 26, further comprising separate injection wells for the first injection solution and the second injection solution.

34. The system of claim 26, wherein a pH of an injection solution is less than about 8.

35. The system of claim 26, wherein the second injection solution has a total salinity of less than about 33% of the first injection solution.

36. The system of claim 26, wherein the second injection solution has a total salinity of greater than about 10,000 ppm.

37. The system of claim 26, wherein an average subterranean formation temperature of the subterranean formation is greater than about 130° F. (54° C.).

38. The system of claim 26, further comprising a single well bore for both injection and production.

* * * * *